(12) United States Patent
Chopra et al.

(10) Patent No.: US 6,611,875 B1
(45) Date of Patent: Aug. 26, 2003

(54) CONTROL SYSTEM FOR HIGH SPEED RULE PROCESSORS

(75) Inventors: Vikram Chopra, Pune (IN); Ajay Desai, Pune (IN); Raghunath Iyer, Los Altos, CA (US); Sundar Iyer, Palo Alto, CA (US); Moti Jiandani, Fremont, CA (US); Ajit Shelat, Pune (IN); Navneet Yadav, Pune (IN)

(73) Assignee: PMC-Sierra, Inc., Santa Clara, CA (US)

( * ) Notice: Subject to any disclaimer, the term of this patent is extended or adjusted under 35 U.S.C. 154(b) by 0 days.

(21) Appl. No.: 09/305,783

(22) Filed: Apr. 30, 1999

Related U.S. Application Data

(63) Continuation-in-part of application No. 09/224,382, filed on Dec. 31, 1998.

(51) Int. Cl.[7] .............................................. G06F 15/16
(52) U.S. Cl. ..................................... 709/245; 709/238
(58) Field of Search ................................. 709/238, 245

(56) References Cited

U.S. PATENT DOCUMENTS 5,805,915 A * 9/1998 Wilkinson et al.
5,864,827 A * 1/1999 Wilson
5,951,651 A * 9/1999 Lakshman et al.

* cited by examiner

Primary Examiner—Emanuel Todd Voeltz
(74) Attorney, Agent, or Firm—Dag Johansen; Stattler, Johansen & Adeli LLP

(57) ABSTRACT

A control system for high-speed rule processors used in a gateway system is disclosed. The gateway system employing the current invention can process packets at wire speed by using massive parallel processors, each of the processors operating concurrently and independently. Further, the processing capacities in the gateway system employing the current invention are expandable. The number of packet inspector engines may be increased and all of the engines are connected in a cascade manner. Under the control system, all of the engines operate concurrently and independently and results from each of the engines are collected sequentially through a common data bus. As such the processing speed of packets becomes relatively independent of the complexities and numbers of rules that may be applied to the packets.

12 Claims, 24 Drawing Sheets

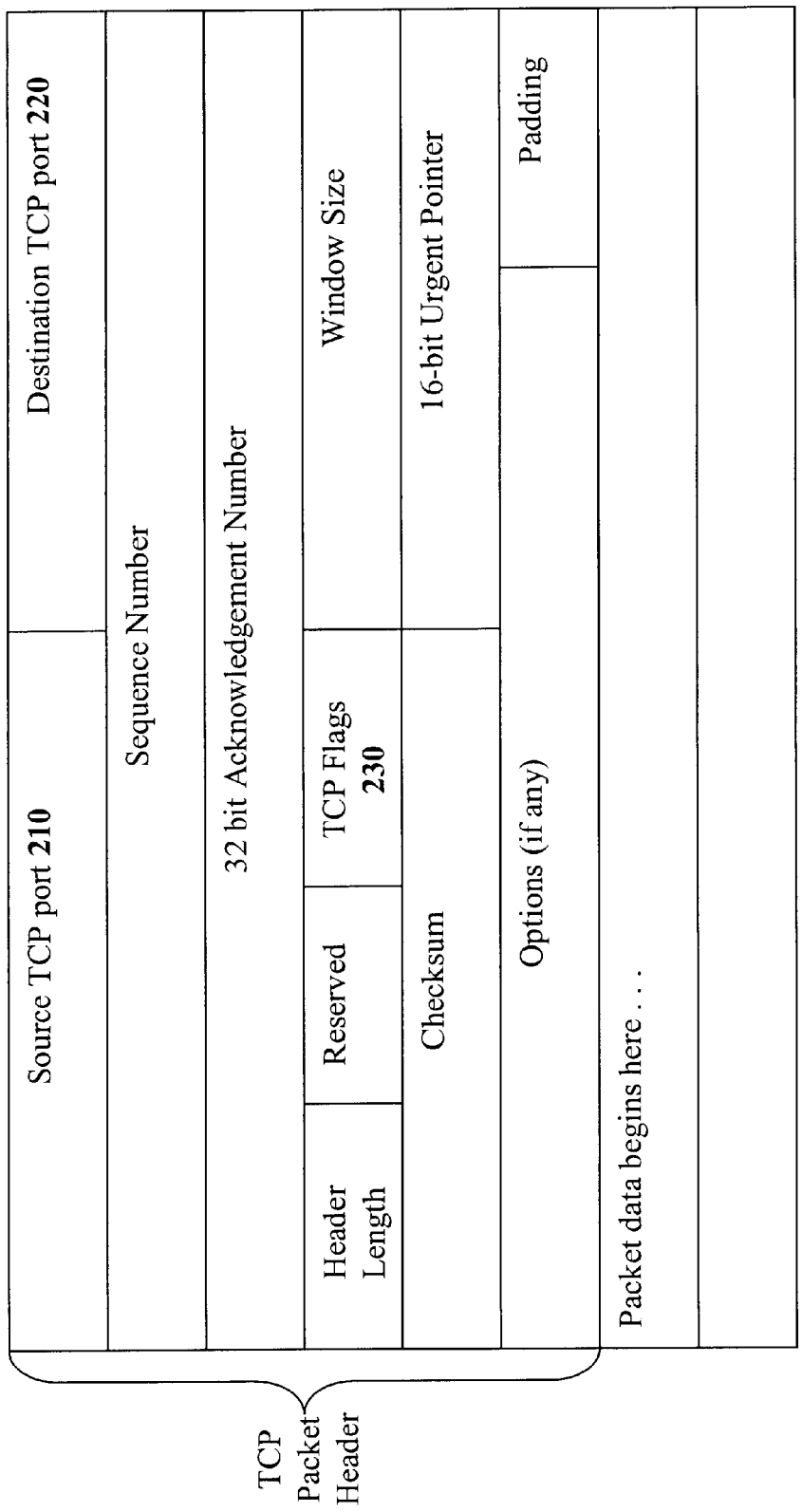
*Fig. 2a*   Transport Control Protocol Packet

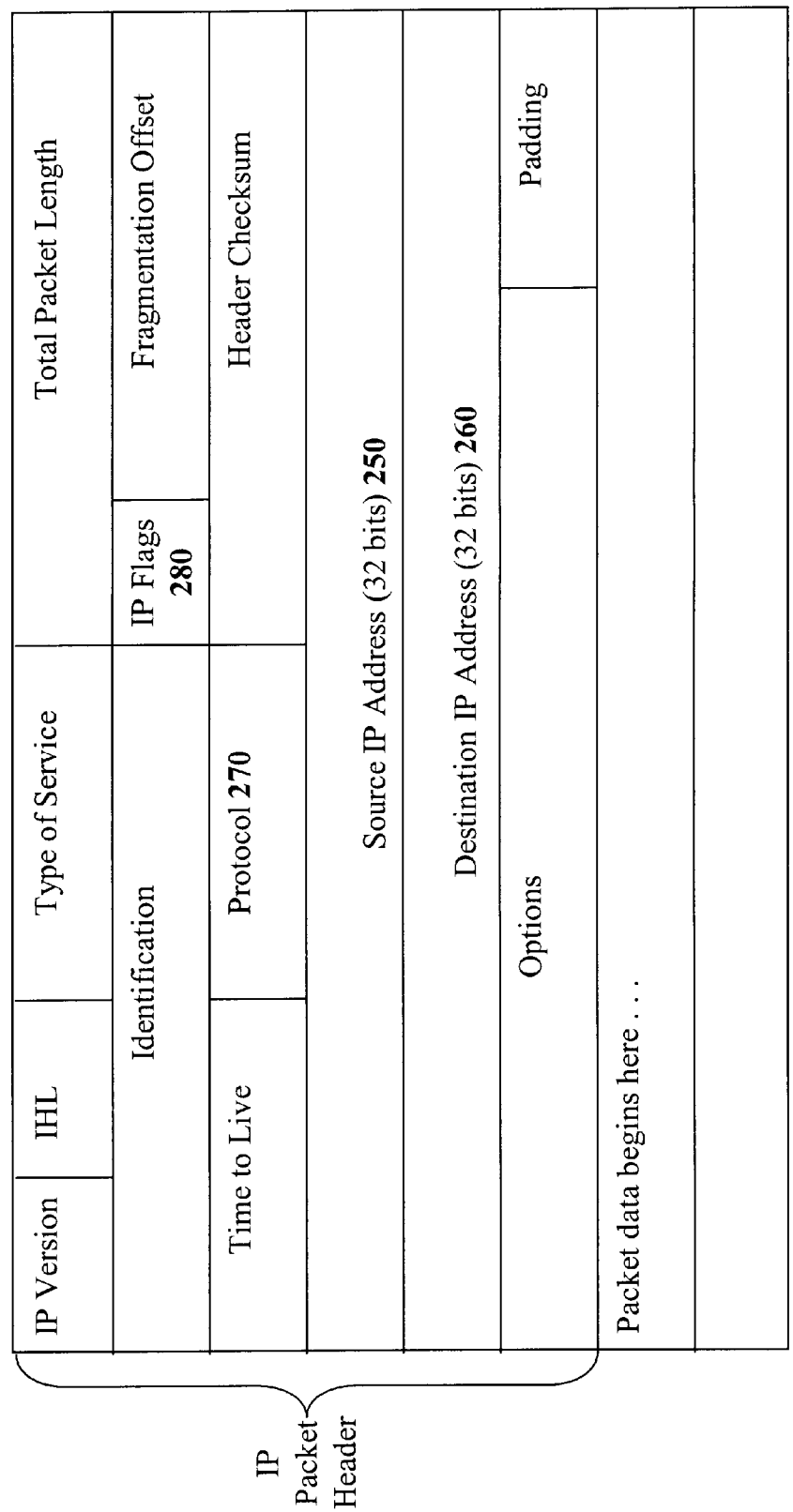
Fig. 2b  Internet Protocol Packet

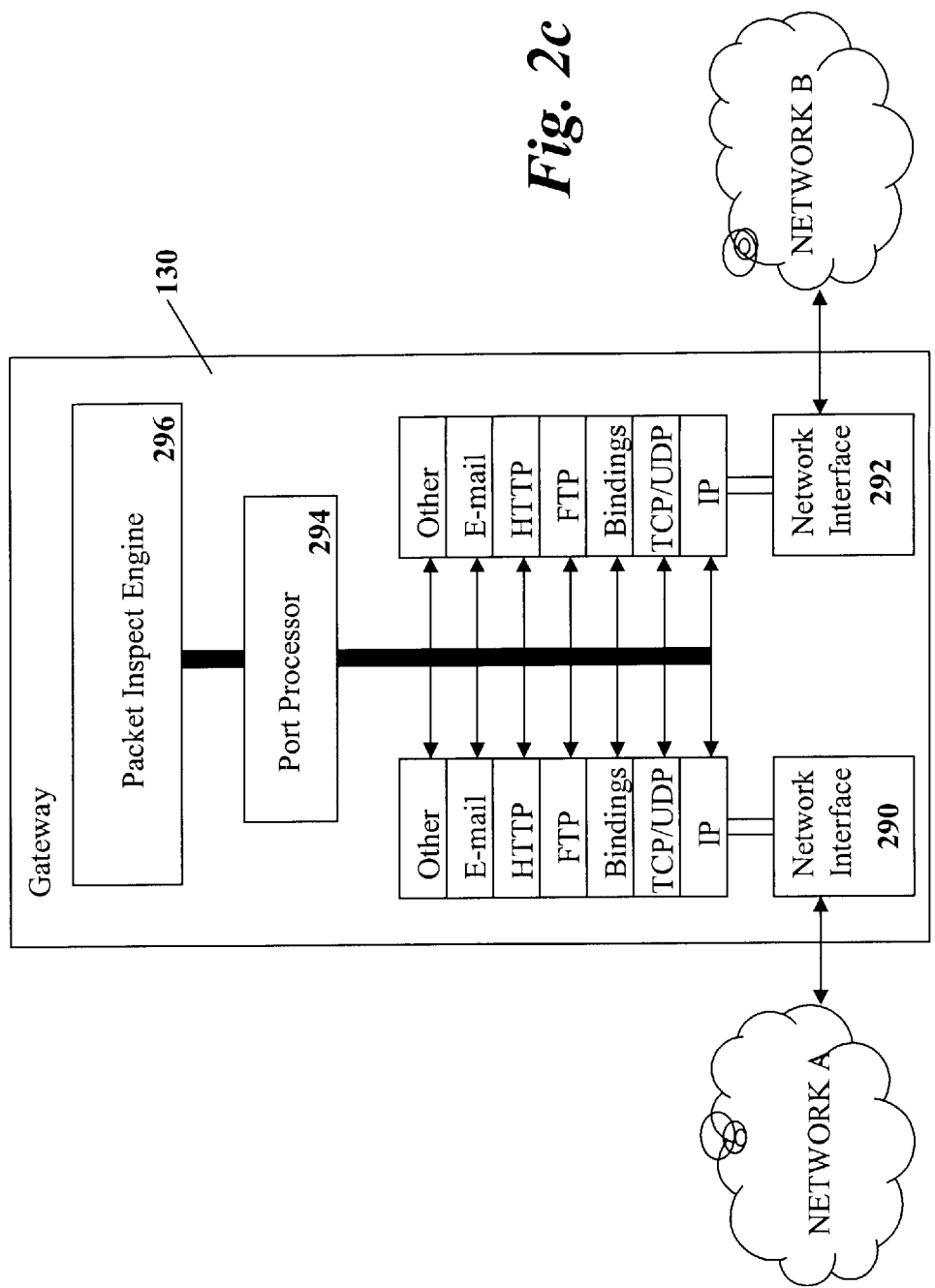

Fig. 3c

Control Unit 310

Control Register: 312
- ID Register
- Configuration Register
- Interrupt Mask Register
- Local Status Register
- Global Status Register
- Timer Register
- R/W Command Register
- OC Command Register

AoC Register: 314
- AoC Address R/W Register
- AoC Matched Cell Address Register
- AoC OC Descriptor Register
- AoC Rib Alarm Condition Register
- AoC Rib Statistic Register
- OC Conductor Index Register

HEE Register: 316
- HEE Status Register
- HEE Packet Attribute Register
- HEE Header Register
- HEE Packet Header Threshold Register
- HEE Packet Count Register
- HEE Layer 3 Offset Register

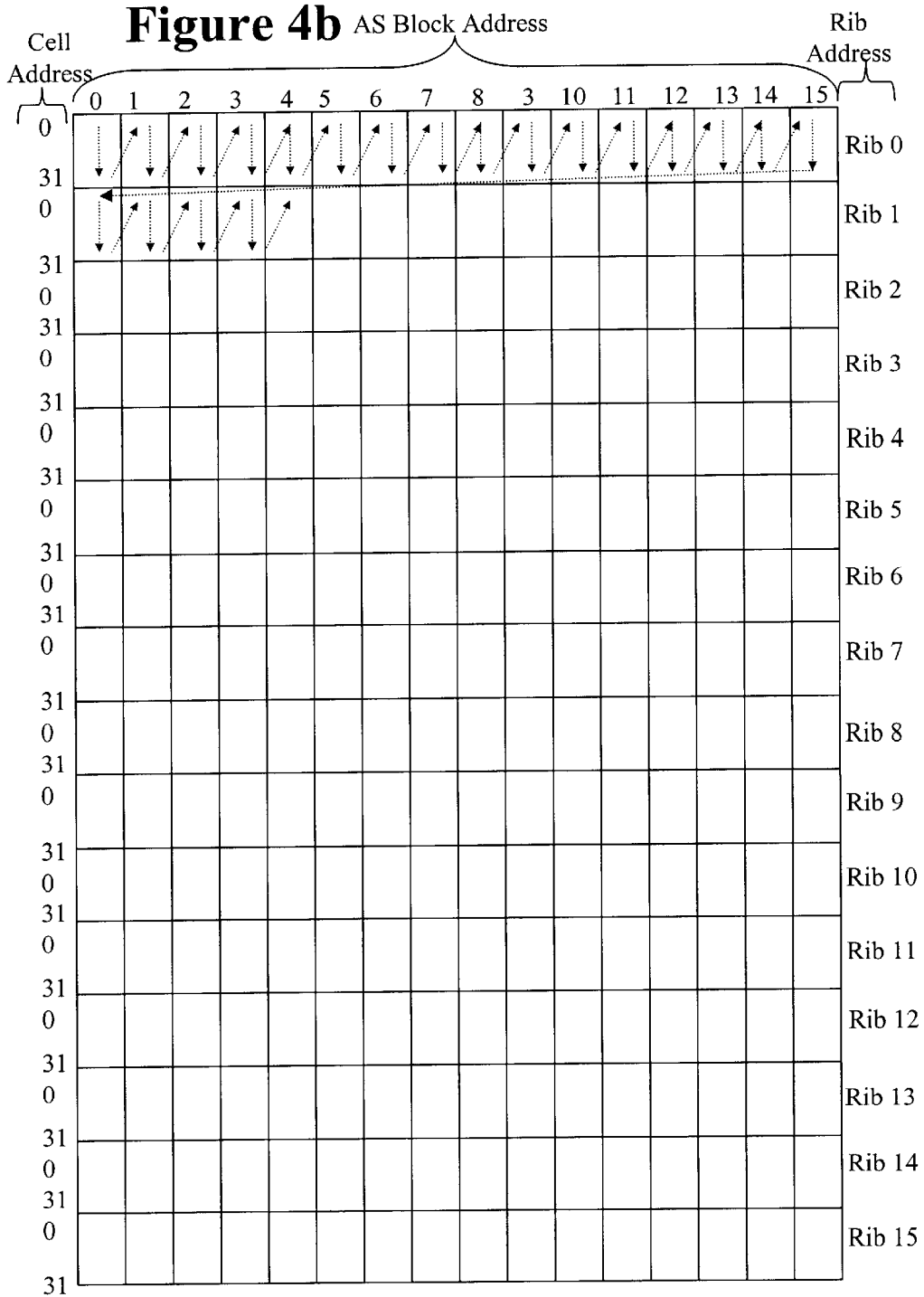

Operation Cword

| OC Descriptor Index (6 bit) | Starting PIE ID (4 bit) | Ending PIE ID (4 bit) | Branch Condition (4 bit) | Opcode-M (4 bit) | Branch Offset (3 bit) | Connection Cword Validity (1) | Increment Byte Count (1 bit) | Update Timestamp (1 bit) | Branch Address (17 bit) | Results Field (15 bit) |

Coded firewall rule control

| ALU #1 control bits 5-bits | ALU #2 control bits 4-bits | ALU #3 control bits 5-bits | ALU #4 control bits 5-bits | ALU #5 control bits 1-bit | ALU #6 control bits 1-bit | Common control bits 3-bits |
|---|---|---|---|---|---|---|

Fig. 7b

| ALU #1 Opcode 3-bits | ALU #1 Mask enable 1-bit | ALU #1 Packet Routing 1-bit |
|---|---|---|

=

| ALU #1 control bits 5-bits |
|---|

Fig. 7c

| ALU #2 Opcode 2-bits | ALU #2 Mask enable 1-bit | ALU #2 Packet Routing 1-bit |
|---|---|---|

=

| ALU #2 control bits 4-bits |
|---|

| ALU #3<br>Opcode<br>2-bits | ALU #3<br>Mask enable<br>1-bit | ALU #3<br>Packet Routing<br>2-bits |
|---|---|---|

ALU #3 control bits 5-bits =

Fig. 7d

| ALU #4<br>Opcode<br>2-bits | ALU #4<br>Packet Routing<br>2-bits | ALU #4<br>Merge bit<br>1-bit |
|---|---|---|

ALU #4 control bits 5-bits =

Fig. 7e

| ALU #5<br>Enable bit<br>1-bit |
|---|

ALU #5 control bits 1-bit =

Fig. 7f

CONTROL SYSTEM FOR HIGH SPEED RULE PROCESSORS

CROSS-REFERENCE TO RELATED APPLICATION

This application is a continuation-in-part of pending U.S. Pat. No. 09/224,382 filed Dec. 3, 1998 entitled "Method and Apparatus for High-Speed Network Rule processing", which is hereby incorporated by reference for all purposes.

FIELD OF THE INVENTION

The present invention relates to the field of computer networking. In particular the present invention discloses a control system for high speed rule processors that efficiently implement firewall, IP routing, quality of service, load balancing, and/or network address translation rules in a gateway at wire speed.

BACKGROUND OF THE INVENTION

The Internet is a worldwide interconnection of computer networks that share a common set of well-defined data communication protocols. Specifically, most computer networks are coupled to the Internet communicate using the Transport Control Protocol (TCP) and Internet Protocol (IP) commonly known as TCP/IP. This protocol provides an error-free data connection between two computing devices and sits underneath and works in conjunction with higher level network protocols including HyperText Transfer Protocol (HTTP), File Transfer Protocol (FTP), Network News Transmission Protocol (NNTP), etc.

There is no central controlling authority in the global Internet. Individual entities coupled to the Internet are responsible for their own interactions with the Internet. To protect private networks, such as Local Area Networks (LANs) and the Intranet, most private networks use a gateway that is a network point acting as an entrance to another network. Essentially the gateway controls the flow of traffic between two networks, such as communications between computers on a local area network and computers out on the Internet. Examples of such functions in a gateway include network address translation, firewall protection, IP routing, quality of service, and/or load balancing.

Network address translation (NAT) is used to translate addresses from a first address domain into addresses within a second address domain. A typical device with network address translation has two different network ports. The first network port is coupled to an internal network with an "internal" network address and the second network port is coupled to the global Internet with a legally allocated Internet protocol address. The two-port network address translation device thus handles all Internet communication between internal computer nodes having internal network addresses and an Internet computer system having fully qualified Internet Protocol addresses.

Firewall protection attempts to prevent unauthorized accesses. Firewall protections are implemented using a set of packet filtering rules. Each packet-filtering rule specifies a particular packet filtering policy. For example, all packets incoming from the Internet addressed to vulnerable server ports may be discarded in order to protect the internal servers on the local area network. The firewall device examines each packet and applies any applicable firewall packet-filtering rules.

Routing is the process of locating the path to be taken by a packet in the Internet. Routing rules specify a next hop address and the port number associated with the next hop to be taken by a packet. For example, all packets which are destined to a particular IP network can be sent to a LAN port (a port attached to the local area network) and all other packets may be sent to WAN port (a port attached to the wide area network)

Quality of Service or QoS is an idea that transmission rates, error rates, and other characteristics can be measured, improved, controlled and, to some extent, guaranteed in advance. QoS can be measured and guaranteed in terms of the average delay in a gateway, the variation in delay in a group of cells, cell losses, and transmission error rate. QoS is of particular concern for the continuous transmission of high-bandwidth video and multimedia information. For example, packets from a high-paying commercial customer may receive a higher grade of service than packets from a low-paying customer. Similarly, packets from a real-time video or audio streaming application may receive more prompt service than packets from a large file transfer operation.

Load balancing is a task of selecting a least utilized resource such that a "load" is balanced among all the available resources. For example, a popular web page will be placed on a large number of similarly configured server systems. When a web client requests a popular web page, a load-balancing device will select the server system that is currently experiencing a light load.

These common gateway tasks are often performed by computer systems employing general-purpose processors executing proxy programs. When a gateway is used for a very large network with a high bandwidth communication channel, the gateway has to process a large amount of packets each second using rules that implement the gateway features. In such high demanding environment, a gateway employing general-purpose processors will be inadequate to produce sufficient throughput, which may subsequently deteriorate the network performance. It would be therefore desirable to have a control system for a high-speed rule processor that can be used in a gateway to perform common gateway tasks. In addition, to further improve the network throughput, multiple rule processors are often used in parallel, the control system is desired to control and synchronize the operations of the rule processors to achieve seamless and various gateway tasks at wire speed.

SUMMARY OF THE INVENTION

In view of the above, it is one of the objects in the present invention to provide a control mechanism for high-speed rule processors in a gateway system. These high-speed rule processors may act as firewall in the conventional sense and also as a packet classification and filtering system. The gateway system is positioned on a network connection between, for example, a public network and a private network that is protected from attacks. The gateway system comprises a management processor or module that inspects each incoming and outgoing packet and sends pertinent information about the packet to an engine that determines, based upon a plurality of rules, what actions should be taken on the packet.

The advantages of the present invention are numerous. Different embodiments or implementations including a method, an apparatus and a system may yield one or more of the following advantages. One advantage is that a gateway system employing the current invention can process packets at wire speed by using massive parallel processors, each of the processors operating concurrently and independently. Another advantage of the present invention is the rescalability of a gateway system employing the current invention. The number of the engines in use can be expanded. The multiple engines are connected in a cascade manner. Under the control system, all engines operate concurrently and independently. Results from each of the engines are collected sequentially through a common data bus such that the processing speed of packets becomes relatively independent of the complexities and numbers of rules that may be applied to the packets.

Objects and advantages together with the foregoing are attained in the exercise of the invention in the following description, resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2a illustrates the format of a packet from the Transport Control Protocol layer.

FIG. 2b illustrates the format of a packet from the Internet Protocol layer.

FIG. 2c depicts a function diagram of a gateway between two networks.

FIG. 3c shows a control unit that controls the operations of a PIE and array of cells (AoC) therein.

FIG. 4b illustrates a conceptual addressing diagram for addressing the individual cells (rules) in the array of cells (AoC).

FIG. 5c illustrates the contents of a sixty-four bit Operation CWord in one embodiment of the invention.

FIG. 7a illustrates one embodiment of an encoded firewall rule that controls the operation of a nanocomputer.

FIGS. 7b, 7c, 7d, 7e, 7f, and 7g illustrates, respectively, the first, the second, the third, the fourth,.the fifth and the sixth ALU control portion of the encoded firewall rule of FIG. 7a.

FIG. 7h illustrates the common control bits portion of the encoded firewall rule of FIG. 7a.

DETAILED DESCRIPTION OF THE PREFERRED EMBODIMENT

A control system for high speed rule processors for performing high-speed packet processing is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to an embodiment within a gateway that couples a local area network to the global Internet. However, the same packet-processing engine can easily be used in other applications such as general-purpose routers and the accounting systems of Internet Service Providers (ISP) that monitor and control the network usage of various ISP customers. Furthermore, the control processing teachings of the present invention have been disclosed with reference to network address translation, firewall protection, quality of service, IP routing, and/or load balancing tasks. However, other types of packet processing tasks may also be implemented.

An Internet Gateway Application

Figure 1:
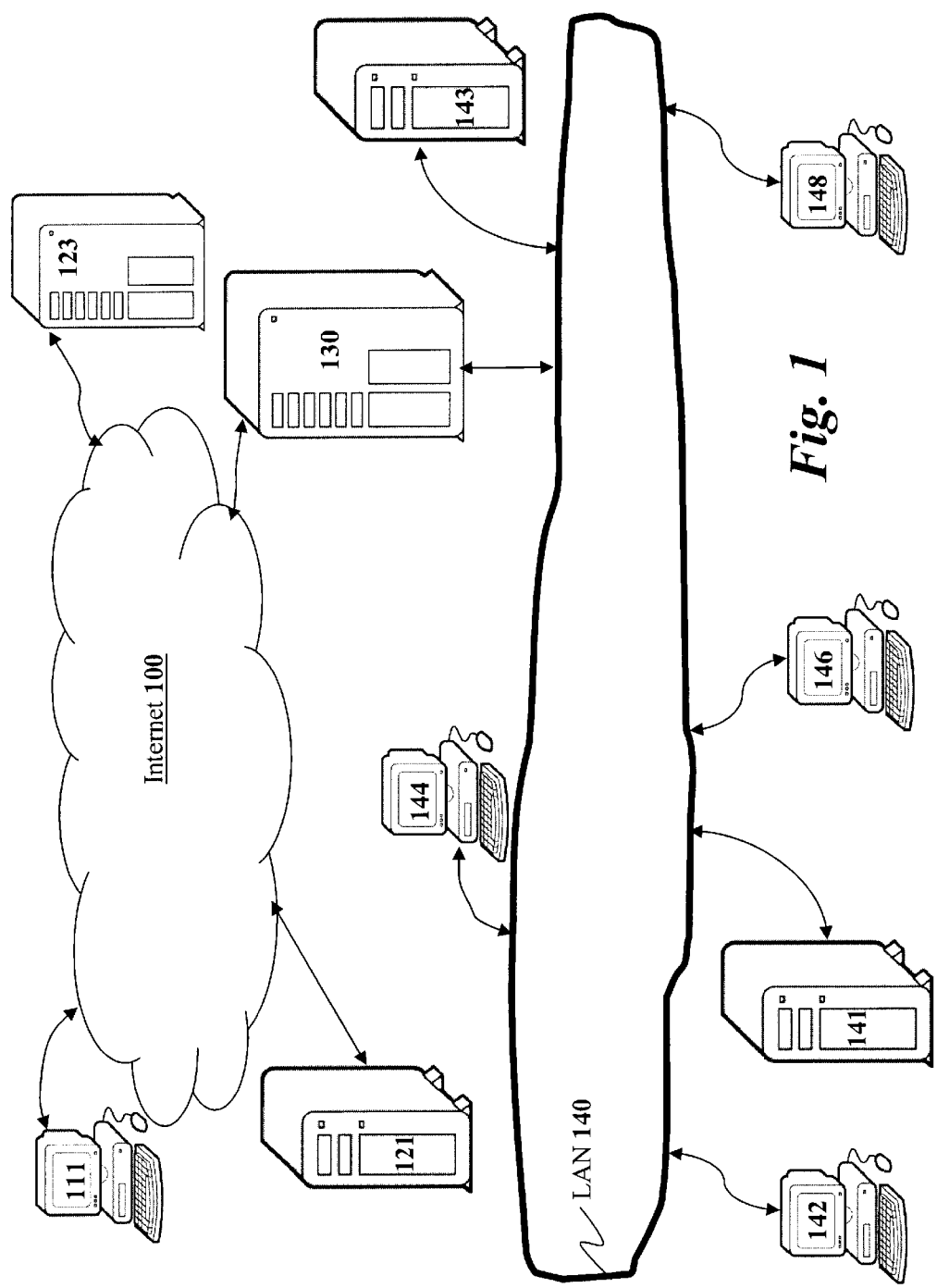
FIG. 1 illustrates a typical small local area network (LAN) coupled to the Internet through an Internet gateway device that performs a variety, of packet processing tasks for data packets that travel between a local network and the Internet.

FIG. 1 illustrates one possible network application of high-speed packet processing. Specifically, FIG. 1 illustrates a local area network coupled to the global Internet with an Internet gateway device that performs packet processing.

Referring to FIG. 1, a local area network (LAN) 140 is illustrated with a set of computer workstations. 142, 144, 146, and 148 coupled thereto. The local area network (LAN) 140 environment also includes a couple of servers 141 and 143. If the servers 141 and 143 are only used for internal purposes then the internal servers 141 and 143 should only be accessible by internal clients such as computer workstations 142, 144, 146, and 148.

All communication between computer systems on the internal local area network 140 and the global Internet 100 passes through an Internet gateway 130. The Internet gateway 130 may provide a number of packet processing features. For example, the Internet gateway 130 may perform network address translation, firewall protection, quality of service, IP routing, and/or load balancing tasks.

Network Address Translation

Network address translation may be used to translate internal network addresses on the internal LAN 140 into fully qualified Internet addresses for use on the Internet 100. For example, when an internal workstation: 142, 144, 146, or 148 wishes to initiate communication with a server (121 or 123) on the Internet, the Internet gateway 130 intercepts the communication and replaces the internal workstation's source address with a fully-qualified Internet address held by the Internet gateway 130. When the Internet server responds, the Internet gateway 130 will translate the fully-qualified Internet address back into the workstation's internal address and pass the packet onto the internal LAN 140.

Network address translation is normally performed on a connection basis. Specifically, when a client system opens an allowed connection with a server system, a network address translation device memorizes information about that connection. The memorized information may include a client IP address, a client TCP port, a server IP address, and a server TCP port. When a packet is received, the network address translation device searches its list of known connections to determine if and how the address should be translated.

Firewall Protection

Firewall protection provides network security. To prevent unauthorized access, the Internet gateway 130 processes packets with a set of firewall security rules that screen out packets related to unauthorized actions. For example, if the servers 141 and 143 are only to be used for internal purposes then the Internet gateway 130 should screen out all packets originating from the global Internet 100 and destined for the internal servers 141 and 143.

Firewall policies are typically implemented using a list of firewall rules. Each rule specifies a set of conditions to be matched and an associated action. If the conditions in a rule are met then the associated rule action is performed. For most firewall rules, the action specifies if the packet should be dropped or forwarded.

The set of conditions, in each rule varies significantly. Some rules only examine a few packet fields and other rules examine a number of different packet fields. Some rules are only activated upon exact matches and other rules require more complex comparisons such as less-than, greater-than, determining if a values is in a set defined by a particular value and, mask, etc.

Routing

Routing is used to locate the path to be taken by a packet on a computer network such as the Internet. For example, an Internet Gateway 130 will need to look into the destination address of the packet and make a decision on the next hop address of the packet.

Typically routing is done by a lookup into a large routing table that contains a number of routing rules. Each of these routine rules specify a Destination IP address and a Destination Mask associated with the rule. The Router will select the longest matching route that matched the packet.

Quality of Service

Quality of Service is used to provide different levels of service for different customers or different protocol streams. For example, the Internet gateway 130 should provide faster service to packets from a user running an Internet telephony application than to a server performing a file transfer operation. Current qualities of service implementations are not capable of providing quality of service operations at wirespeed.

One standard quality of service task is the servicing of a plurality of a packet queues with the well-known "leaky bucket" servicing algorithm. In a typical implementation of the leaky bucket servicing algorithm, a network device must determine, which queue of a plurality of queues should be serviced next. This determination is made by selecting the queue having the smallest "next time to send" (NTTS) value. The serviced queue's next-time-to-send value is then updated. Many algorithms are available for updating the next-time-to-send (NTTS) values.

Load Balancing

Load balancing is the task of selecting a least utilized resource such that a "load" is balanced among all the available resources. To perform load balancing, a set of load values is maintained for each available resource. When a load balanced resource is required, the resource having the minimum load value is selected. The load value for the selected resource is then updated.

An Integrated Gateway

To perform the network address translation, firewall protection, quality of service, and/or load balancing tasks, the network gateway 130 of FIG. 1 must examine a number of different packet aspects. In an Internet based application, the most interesting packet aspects to examine are in the Transport Control Protocol (TCP) packet header (or a UDP packet header) and the Internet Protocol (IP) packet header. In normal Internet usage, TCP packets are enclosed within IP packets.

FIG. 2a illustrates the format of a Transport Control Protocol (TCP) packet. The objective of the Transport Control Protocol layer is to ensure a reliable connection between two computer nodes. Of particular interest to packet filtering applications are the source TCP port 210 and the destination TCP port 220. In some applications, a packet-filtering device may examine the flags 230 in the TCP packet header.

The TCP packet is typically, enclosed within an Internet Protocol packet. FIG. 2b illustrates an Internet Protocol (IP) packet header. The objective of the Internet Protocol layer is to ensure that an Internet packet is properly routed from a, source node having a source Internet Protocol (IP) address 250 to a destination node having a destination Internet Protocol (IP) address 260. Packet filtering devices typically process packets by examining the source Internet Protocol (IP) address 250 and the destination Internet Protocol (IP) address 260. Another important aspect that may be examined is the Protocol 270 field in the IP packet header. The Protocol 270 field, specifies the type of protocol being used to transport the packet. If a TCP packet is enclosed, then the Protocol will specify the particular type of TCP protocol packet enclosed.

FIG. 2c illustrates a block diagram of the gateway 130 that comprises a pair of network interfaces 290 and 292, a port processor 294 (also known as the management processor) and a packet inspector engine (PIE) 296. As illustrated, the gateway 130 puts up a barrier that controls the flow of traffic between Network A and Network B. Network interfaces 290 and 292, one coupled to Network A and the other one coupled to Network B, facilitate the packet data transmission between the gateway 130 and Network A or Network B. The port processor, 294 determines packet attributes and data parameters such that the relevant packet information (e.g. header information and data information) from incoming packets may be delivered to Packet Inspect Engine (PIE) 296 for processing. PIE 296 processes the packet attributes and determines if incoming packets are authorized to pass through the gateway 130 according to a set of rules and parameters. From another perspective, PE 296 polices the packet data being exchanged between each pair of the application layers (email, file transfer, etc) by examining various aspects of the data with respect to a set of rules, parameters and services.

In an ideal system, a single network border device such as the gateway 130 would be able to extract the desired data fields from the packet data and perform network address translation, firewall protection, quality of service, IP routing, and/or load balancing tasks. Furthermore, to minimize packet latency introduced in inspecting the various aspects of the data, the network border device should perform all of these tasks at "wire speed", meaning that the packets are processed and dispatched just as fast as the packets are received. However, in a gateway system with thousands of rules to process and a number of different services to provide (firewall, network address translation, quality of service, load balancing, etc.) a general purpose processor will not be able to process all of the incoming packets at wire-speed.

The Packet Inspector Engine (PIE) Architecture

To process network packets at wire-speed, the present invention introduces a control system in a massive parallel processor (MPP) architecture on a single integrated circuit (IC) device known as the Packet Inspector Engine (PIE). The Packet Inspector Engine includes an internal compare block known as an Array of Cells (AoC) that is used to perform parallel comparisons against a large number of rules and parameters. Although the control system in the Packet Inspector Engine is disclosed with reference to a TCP/IP based packet filtering application, it may be used in many other applications that require large searches to be performed very quickly.

Figure 3A:
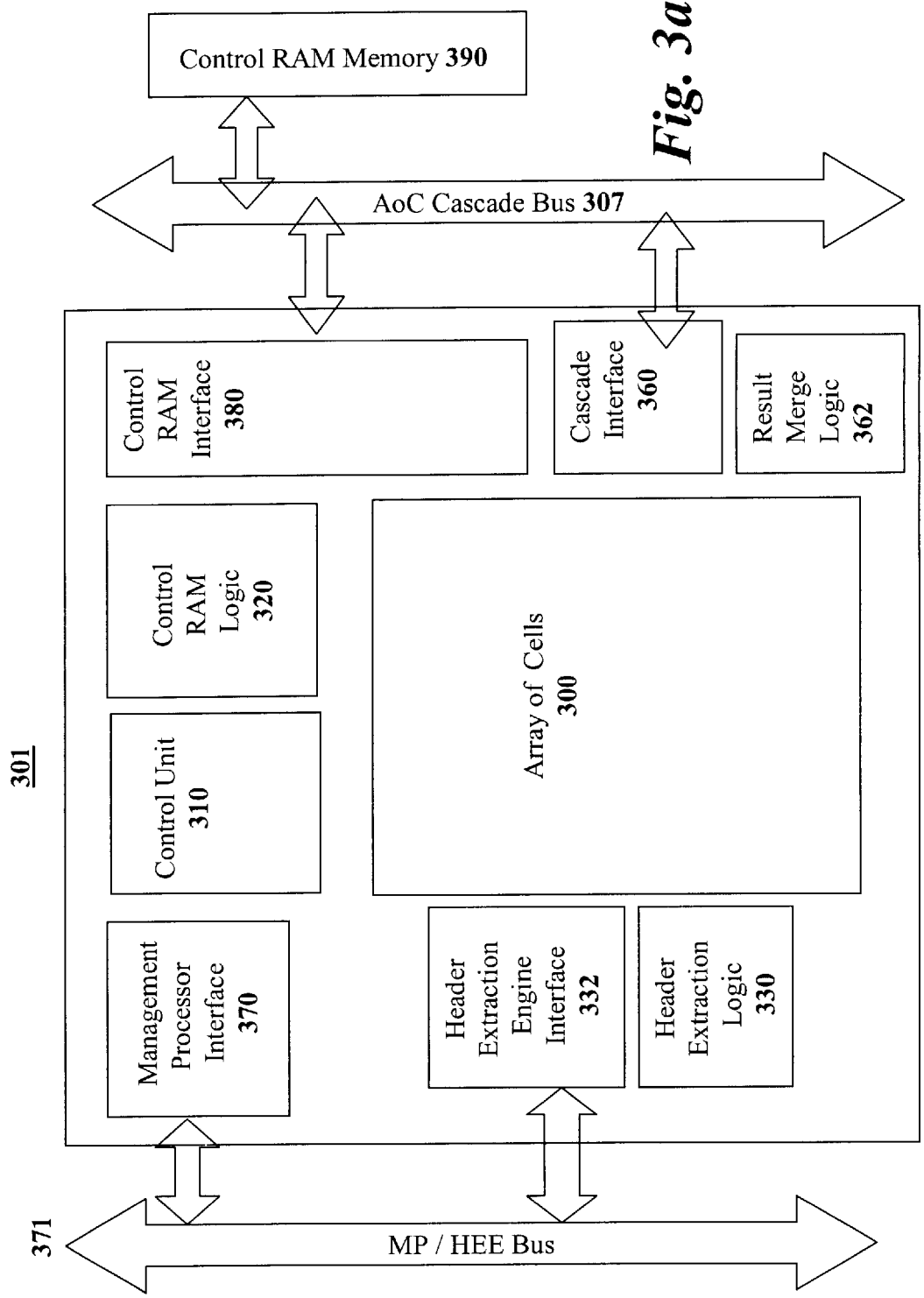
FIG. 3a illustrates the overall block diagram and the general architecture of the Packet Inspector Engine (PIE) in which the present invention may be practiced.

FIG. 3a illustrates an architectural block diagram of the Packet Inspector Engine 301 in which the present invention may be practiced. The PE 301 comprises four primary interfaces; HEE Interface 332, MPI Interface 370, Control RAM Interface 380 and cascade Interface 360 in addition to an array of Cells 300, a control unit 310, a control RAM logic 320 and a header extraction logic 330.

As illustrated, HEE Interface 332 and MPI Interface 370 share a common data bus 371. The HEE Interface 332 is responsible for facilitating relevant. packet information to be forwarded to AOC 300 for processing. In particular, HEE Interface 332 accepts packet attributes from the port processor 294 and the MPI Interface 370 reads and writes to/from various registers in PIE 301 through the same bus 371. Typically, HEE Interface 332 has the following signals that interface with the port processor 294:

1. Data input (packet information);
2. HEE Buffer Available (HBA) output;
3. Data Valid (DV) input; and
4. End of packet (EoP) input.
5. Byte Enable Lines (BE)

The data format for the data input is typically in 64 or 32 bits and programmable through a control signal. Unless otherwise specified, the following description is based on the 64 bits format. The HBA output, when active, indicates that HEE Interface 332 is ready for the packet information of a new packet. The Data Valid (DV) input is a validity signal that the HEE Interface 332 uses to load packet information into an internal buffer thereof, synchronously at each clock edge. The EOP input signal, when active, indicates that the packet data have been loaded into HEE Interface 332. With HBA signal and (EOP) signals, HEE Interface 332 is provided a better control as to when to stop and start receiving any new packet data.

Optionally, HEE Interface 332 includes two threshold registers that are used to specify limits regarding the amount of data that the HEE can accommodate. The first register sets the threshold for the end of a packet header and the second register sets the threshold for the maximum amount of packet data that HEE Interface 332 can read in. The packet data is clocked into the HEE Interface synchronously.

Figure 3B:
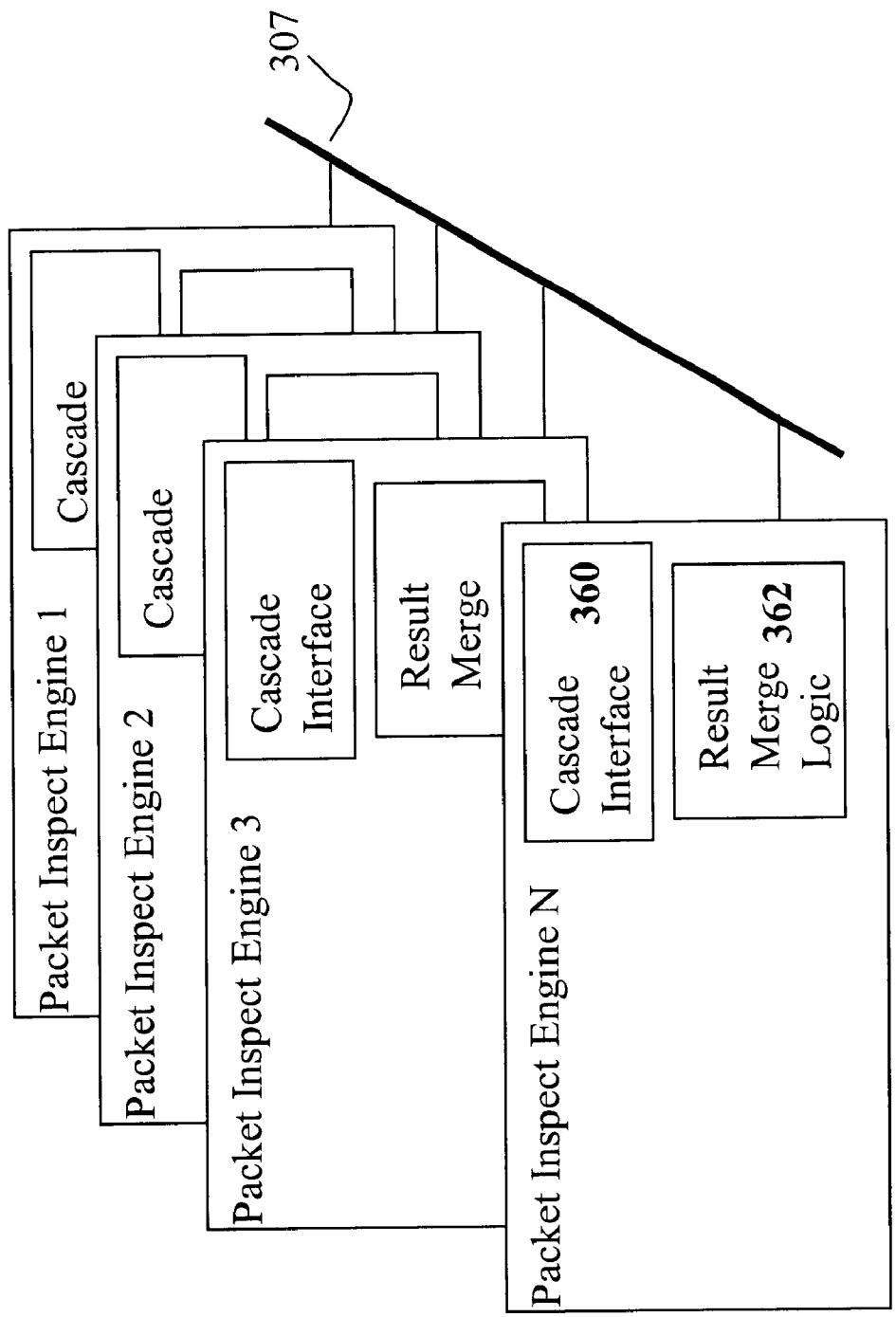
FIG. 3b demonstrates parallel operation of multiple Packet Inspector engines configured in cascade mode.

MPI (Management Processor Interface) 370 is used to read and write to/from various registers in PIE 301 through the bus 371. To enhance the performance and increase signal throughput of the gateway, multiple Packet Inspector Engines (PIES) are preferably used and typically arranged in a cascade manner and operated in parallel as illustrated in FIG. 3b. Rules and parameters determining the fate of a packet are distributed among the Packet Inspector Engines (PIEs). In other words, each PIE processes the packet information independently with regard to the rules and parameters allocated thereto. The decision regarding the packet is kept in Result Merge Logic 362 of each of the PIES and subsequently collected through the MPI 370 to a Result Merge Logic 362 in a master PIE. The detailed description on the processing of packet information in the array of cells (AoC) as will as the operation of consolidating respective packet decision will be provided below.

Similar to the HEE Interface 332 and MPI Interface 370, the Control RAM Interface 380 and Cascade Interface 360 share a common data bus "CRAM-Casc_Data_Bus" or simply Cascade bus 307. The cascade interface 360 is used to manage the operations of the multiple Packet Inspector Engines (PIEs) that communicate through the Cascade bus 307. The actual control words (CWords) for executing an operation cycle (OC) are stored in the control RAM (CRAM) memory 390 and accessed through the Cascade bus 307 as well. Further, the control RAM memory 390 contains information for identifying and sequencing of the CWords, connection related information for performing NAT operations and aging operations, statistic information, etc.

Header Extraction Engine

The Header Extraction Engine (HEE) 330 is the first stage of processing for all packet classification operations in the PIE. When an external packet source sends packet data to the PIE, the packet is first buffered in the HEE. The HEE extracts the relevant data or header information for the packet and subsequently serves the extracted data the AoC for rule processing.

The HEE 330 buffer 1514 bytes of data per packet in each of the HEE's two HEE packet buffers. Once one HEE packet buffer is full, the relevant packet data is served to the Array of Cells. (AoC). Meanwhile, the second buffer can be filled by the external packet source.

Having two buffers allows the chip to process a second packet while the first packet is being used for running lookups within the chip. If both internal buffers are full, then the HEE will keep the HBA signal de-asserted.

Every packet that is sent to the PEE 301 over the system bus should be preceded by a 64-bit field known as the Packet Information (PI) field. The Packet Information (PI) field contains information that describes the following packet. Types of packet information that may be delivered include Layer 2 Type, Layer 3 Offset, direction, enable extraction bit, Operating Cycle identifiers, and user-defined Packet Attributes.

Based on information in the Packet Information (PI) field, the HEE 330 performs extraction of IP, TCP and UDP packet header information from within the packet. The HEE 330 stores the extracted packet information in the 108-bit HEE packet header (HPH) Register. In one embodiment, the HEE 330 is designed to understand Ethernet at Layer 2, IP at layer 3 and TCP/UDP at layer 4. Within the Ethernet layer, the HEE 330, understands Ethernet II, Ethernet 802.3 and Ethernet 802.1 p/q.

The HEE 330 also has the capability of selecting 108 bits starting at a byte boundary anywhere in the HEE packet buffer and storing this in the 108-bit HEE Packet Data (HPD) Register. This is used for searching for specific patterns within a packet.

The HEE 330 also contains a 52-bit HEE Packet Attribute (HPA) register that is filled with the packet attribute field or can be written to by the external processor. Based on a field in the OC Descriptor, the HEE 330 can be instructed to serve the AoC with data from either one of the above three sources—HPH, HPD, or HPA. The HEE 330 performs extraction of header fields in parallel after receiving data into its buffers. In order for the HEE 330 to start extraction of information on a packet, the HEE 330 uses the information of the PI field in the following manner:

HEE Processing

The HEE first needs to be told that the packet is an Ethernet packet. This is done using the packet type bits in the packet information field. If it is not an Ethernet packet, then the HEE 330 needs to be told the offset within the packet at which the layer 3 IP header starts. Furthermore, the HEE 330 needs to be told whether header extraction should be enabled or not by setting the extraction enable bit in the packet information field.

Figure 3D:
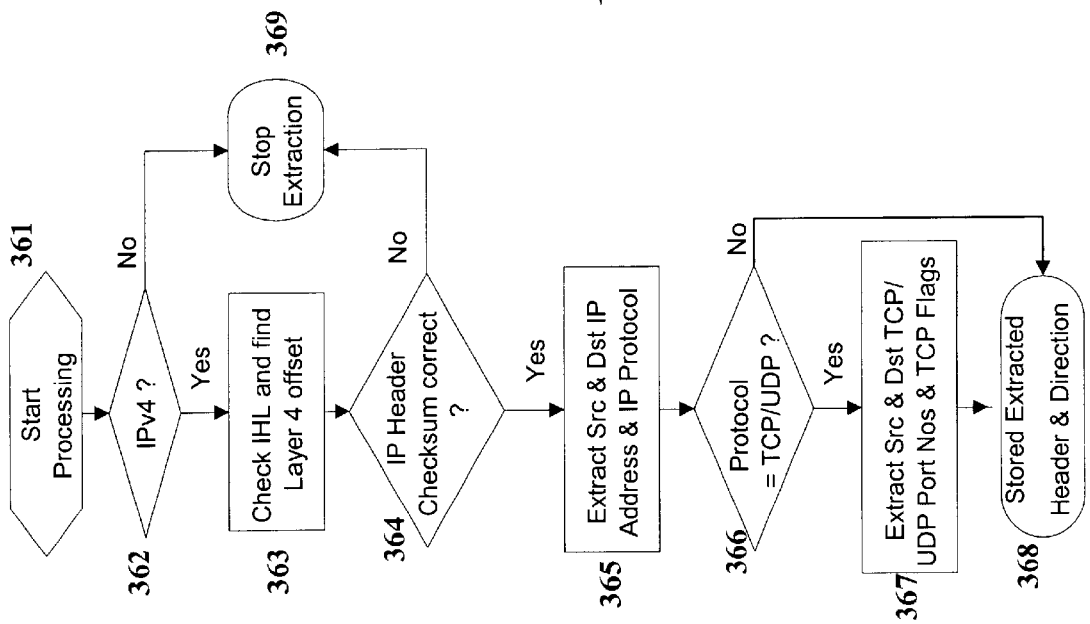
FIG. 3d shows the flow of operations within the Header Extraction Engine.

FIG. 3d illustrates the flow of a packet in the HEE 330. The HEE 330 begins by looking into the packet at step 361. At step 362, the HEE determines if the packet is an IPv4 type packet. If the packet is not an Ipv4 packet then the HEE stops the extraction process at step 369. If the, HEE determines that the packet is an IPv4 type packet at step 362, then the HEE 330 processes the Ipv4 type packet at step 363. In one embodiment, the HEE processes the IPv4 type packet by checking the header length of the IP packet, finds the layer 4 offset, and determining a IP header checksum at step 363. If the checksum is, incorrect then the HEE stops the extraction process at step 369.

Next, at step 365, the HEE extracts the source and destination IP address of the packet. After extracting the source and destination IP address of the packet, the HEE 330 determines if the packet is using TCP or UDP as a transport layer protocol at step 366. If the transport protocol is neither TCP nor UDP then the HEE stores the extracted data at step 368. If the protocol is TCP or UDP, then the HEE extracts the port numbers at step 367. Then at step 368, the IP information and the TCP/UDP information are stored.

Cascade Interface

The PE's can be cascaded in order to increase the number of rules supported. In one embodiment up to sixteen Packet Inspector Engines (PIEs) can be cascaded such that one of the PIE's is configured as the master and the remaining are configured as slaves. The cascade logic operations can be broadly classified into Full Operation Cycles (Full OC) and Partial Operation Cycles (Partial OC). A full operation cycle (Full OC) runs comparisons with all the applicable rules and returns a final result. Partial Operation Cycles (Partial OC) run until a first match has been detected.

Figure 3E:
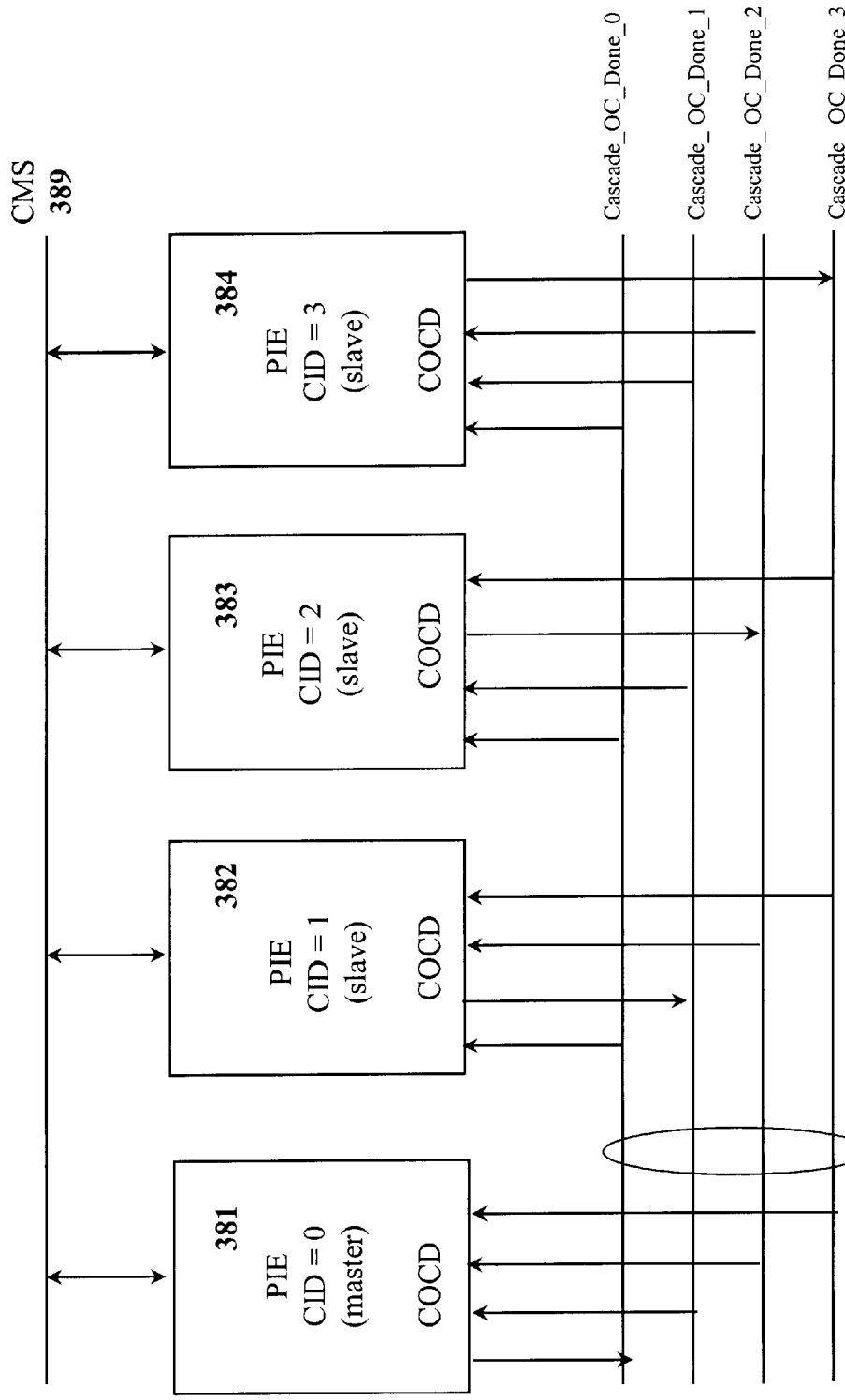
FIG. 3e further illustrates the cascade interface signals when the multiple packet inspection Engines are configures in parallel.

FIG. 3e illustrates one embodiment of four Packet Inspector Engines (PIEs) in a cascade arrangement. (In another embodiment, eight PIE chips may be cascaded together.) As illustrated in FIG. 3e, each Packet Inspector Engine (PIE) is assigned a Cascade Identifier (CID) value. The CID value in each of the PIE chips indicated its priority on the cascade bus 307. The master PIE chip 381 with CID=0 has the highest priority. The priorities decrease with increasing CID numbers.

In an embodiment where up to four PIE's can be cascaded, there are four Cascade, Operating Cycle Done (COCD)) pins and one CMS pin for each PIE on the cascade interface. The COCD pins can be configured as input or output. Exactly one COCD pin identified by PIE's identifier value acts as output and the remaining pins act as inputs. The identifier value of a PIE is a unique value given to that PIE with respect to other PE's.

FIG. 3e shows an embodiment where four PIE's are cascaded in parallel. The COCD pins 381, 382, 383 and 384 having output direction drives the correspondingly numbered COCD pins for the other PIE chips in the Cascade. Thus, each PIE receives the COCD'status of all the other PIE chips.

Referring to FIG. 3e, the Cascade Match Signal (CMS) 389 is common to all the PIE chips. Each PIE chip drives this signal only when it receives COCD status from all the lower priority PIE chips. Thus, there is no contention on the Cascade Match Signal (CMS) 389 line.

Partial OC Description

The master PIE 381 drives the Cascade Operating Cycle Done (COCD) pin to initiate the Operating Cycle (OC). All the participating slave PIE chips 382, 383, and 384 de-assert their Cascade Match Signal (CMS) signals 389 and their Cascade Operating Cycle Done (COCD) status signals and begin applying their respective rules simultaneously. All the non-participating PIE chips assert their Cascade Operating Cycle Done (COCD) status signal and de-assert their Cascade Match Signal (CMS) 389.

The slave PEE chips that have completed the application of all the rules without hitting the match will assert their corresponding Cascade Operating Cycle Done (COCD) signals. The participating PIE chips that hit a match and have not received Cascade Operating Cycle Done (COCD) status assertion signal from all the higher priority PIE chips will suspend the current operating cycle (OC). Such PIE chips wait for all the higher priority PIE chips to complete their operating cycles (OCs).

The PIE chip that has found a match and has also received a Cascade Operating Cycle Done (COCD) status from all the higher priority PIE chips asserts its Cascade Match Signal (CMS) 389. That PIE chip then transfer the results to the master PIE 381. Once the present match is serviced, the master PIE 381 may ask the cascade of the chips to continue the operating cycle (OC).

The Master PIE 381 may abort the OC at any time. In such an event, the PIE chips that have not completed their OCs abort the OC. Any PIE chips that have suspended and are waiting for all the higher priority PIE chips to assert the COCD status also abort their OCs. All the PIE chips get ready to read the next command from the master PIE 381 or from the packet source.

Since all the PIE chips receive the COCD status from all the other PIE chips, termination of the Partial OC takes place when all the PIE chips have completed their OCs.

Full OC Description

The Master PIE 381 drives the COCD pin to initiate the OC. All the participating PIE chips de-assert their Cascade Match Signal (CMS) signals 389 and their COCD signal and start applying their rules simultaneously. All the non-participating PIE chips signal their COCD status and de-assert their CMS signal 389.

The PIE chips that have completed the application of all the rules without hitting the match will assert their corresponding COCD signals. The participating PIE chips that have hit a match and have not received COCD assertion signal from all the higher priority PE chips, register the match result and continue the OC. No further match results are registered since the first match is the highest priority match.

The PIE chip that has found a match and has also received COCD status from all the higher priority PIE chips, assert the CMS and transfer the results to the master PIE 389. This PIE continues the application of the rules and no further match results are registered. The statistic counter update continues for all the rules that have matched and Statistic Enable bit set.

If any of the PIE chips asserts the CMS signal, all the other PIE chips flush their results. Any PIE chip that has not completed the OC continues applying the rules and updating the statistic counter whenever required. Since all the PIE chips receive the COCD status from all the other PIE chips, termination of the Full OC takes place when all the PEE chips have completed their OCs.

The only difference between the Partial OC and the Full OC is whether the PIE chips continue the OC or discontinue the OC after the first match. In case of a Full OC, only one match result is obtained, whereas in the case of a Partial OC all the results can be obtained by continuing the Partial OC. The command to continue is given by the port processor and it can discontinue the Partial OC anytime.

Array Of Cells (AoC)

Figure 4A:
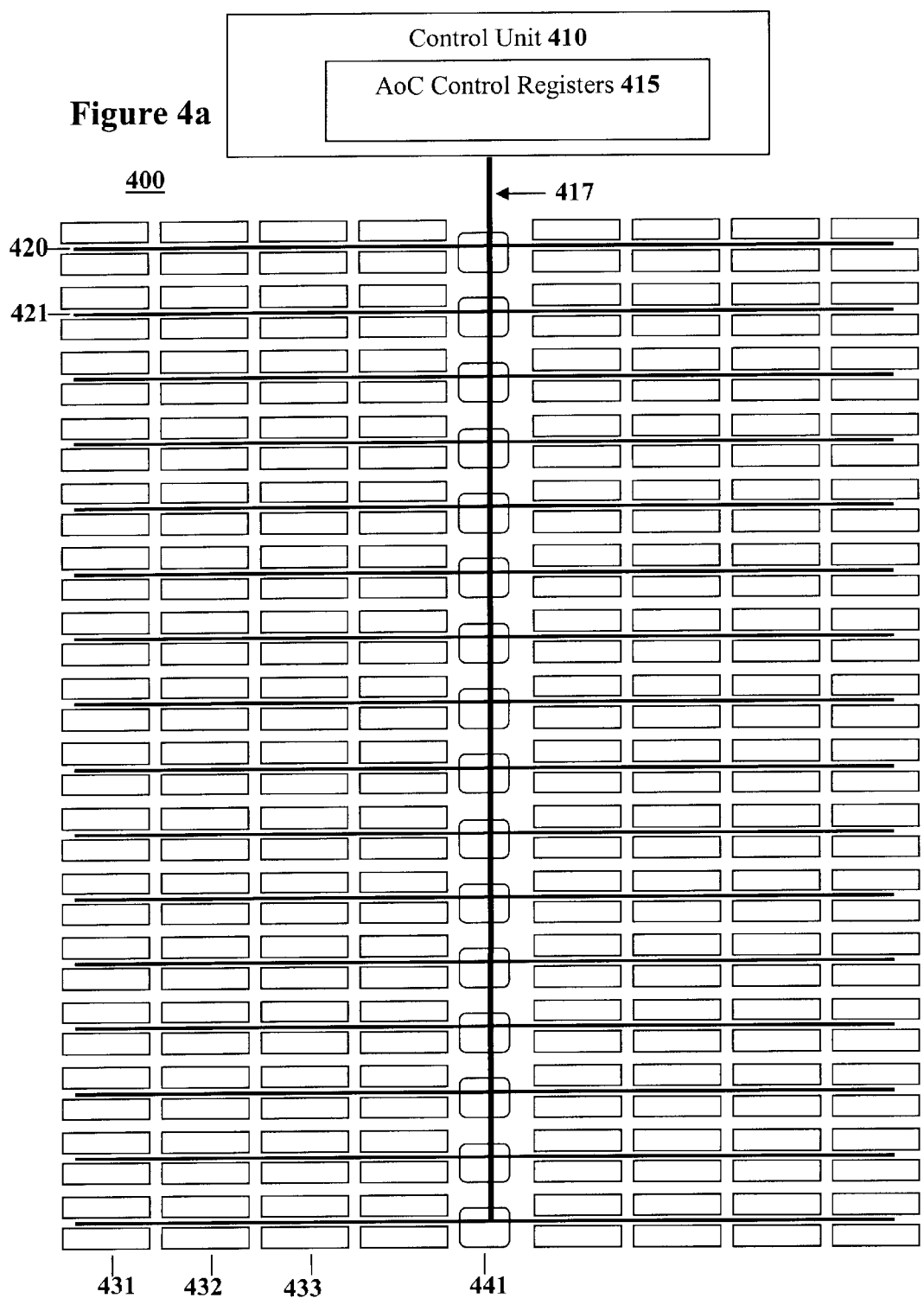
FIG. 4a illustrates one possible array arrangement of individual nanocomputers (i.e. AOC).

The Array of Cells 300 is a massive parallel processor (MPP) comprising individual cells. Each cell is defined as a rule with an accompanying nanocomputer. To conserve space, several rules share the same nanocomputer such that rules that share the same nanocomputer operate successively instead of concurrently. FIG. 4a illustrates an exemplary implementation of an Array of Cells (AoC). As illustrated, AoC 400 operates under the control unit 410 that includes several control registers 415. The control unit 410 controls a large array of nanocomputer units (431, 432, 433, etc.) through a main packet distribution bus 417.

The main packet distribution bus 417 is coupled to a set of "rib busses" (420, 421, etc.) that couple the individual nanocomputer units (431, 432, 433, etc.). Each rib bus (420, 421, etc.) is controlled by a rib control unit such as 441. The rib control unit on each rib bus helps control the nanocomputer units on that rib bus. In the embodiment of FIG. 4a, there are sixteen (16) rib buses coupled to the main packet distribution bus 417 and sixteen (16) nanocomputer units coupled to each rib bus for a total of two hundred and fifty-six (256) nanocomputers in AoC 400.

Each nanocomputer unit (431, 432, 433, etc.) contains command and data information for processing a number of different rules. In one embodiment, each nanocomputer unit (431, 432, 433, etc.) contains information for thirty-two (32) different rules. Each of the command and data information units (rules) within each nanocomputer is known as a "cell", hence the name Array of Cells.

In the embodiment of FIG. 4a, AoC 400 with sixteen nanocomputers on each of the sixteen rib buses with thirty-two rules in each nanocomputer can process eight thousand one hundred and ninety-two rules (16*16*32=8192 rules, i.e. 8K). When all the nanocomputers are being used for a single set of rules, all 8192 rules can be processed in a thirty-two-cycle period (one cycle for each cell within each nanocomputer).

FIG. 4b illustrates a conceptual diagram for the matrix of rules stored in the array of cells. In the conceptual diagram of FIG. 4b, each individual rule can be addressed by a four-bit rib address (0 to 15), a four-bit nanocomputer address (0 to 15), and a five-bit cell address (0 to 32). A concatenated form of the rule address would take appears as:

Rule address=[4-bit rib address][four-bit nanocomputer address][five-bit cell address]

In one embodiment, this cell addressing system is used to provide an inherent priority system. The packet inspector engine uses this priority'system to determine a highest priority result among a set of results. In FIG. 4b, a set of dashed arrows indicates the decreasing rule priority in one embodiment. Out of this 32 cells, rule/cell 0 has the highest priority in each AS Block and the priority decreases down to rule/cell 31. Similarly, across AS Blocks, AS Block 0 has the highest priority and the priority decreases down to AS Block 15, which has the lowest priority. For the ribs, again rib 0 is the highest in priority and rib 15 is the lowest. Thus, the rule addressed by rib 0, nanocomputer position 0, and cell position 0 has the highest priority. Similarly, the rule addressed by rib 15, nanocomputer position 15, and cell position 31 has the lowest priority.

In a preferred embodiment, the priority system is programmable such that different priority arrangements may be used. For example, to best distribute a search among all the available nanocomputers, the first row of cells in all the nanocomputers are programmed before the proceeding to the second row cells in all the nanocomputers and so on. In such an arrangement, the highest priority rule is in the first cell of the first nanocomputer of the first rib, the next highest priority rule is in the first cell of the second nanocomputer of the first rib, and so on until all rib blocks are exhausted. This process is repeated for all the remaining cells until the last cell, of the last nanocomputer, of the last rib.

The Serial AoC

In one embodiment, the Array of Cells 300 is implemented in a massively parallel manner wherein each nanocomputer is implemented with a serial register. The packet data flows into the rib blocks via the packet distribution bus 602. Serial registers within each nanocomputer on each rib block receive the data in a serial manner via the rib bus and match the pattern in a bit by bit fashion. Each serial register within the nanocomputer stores the rule that is to be matched and a bit mask associated with the rule. When the pattern is received the nanocomputer masks the received bit with the associated bit mask present in the nanocomputer and compares it to the stored rule bit.

After the comparison, the rule bit as well as the mask bit are shifted serially and the next bit is kept ready for compare. These serial registers are thus circular serial registers wherein the bit is compared and all the bits are shifted. The least significant bit (LSB) is moved to the place previously occupied by the most significant bit (MSB). In this embodiment the AOC cells support only an operand and a mask and do not support range compares.

Control Unit

Referring to FIGS. 3a and 3c in conjunction with FIG. 4a, the control unit 310 (410) primarily controls the operation of the PE 301 and in particular the array of nanocomputer units (431, 432, 433, etc.).through a main packet distribution bus 417. According to one embodiment, the control unit 310 comprises a number of group registers; control registers. 312, AoC registers 314 and HEE registers 316. Each of the group registers further comprises individual registers. Particularly, control registers 312 comprises the following registers:

- ID Register: containing identity (ID) assigned to a PIE. The ID register for the master PIE is set to zero (ID=0). In addition, the ID register determines the starting address of the SRAM cells within the PIE, for example, the starting address=0 when ID=0, hence the starting address=8192 when ID=1 (assuming 8 K cells therein);
- Configuration Register: containing control bits for the PIE, for example, Enable HEE, Enable Control Word Logic, and Enable Cascade, etc.
- Interrupt Mask Register: specifying masks for various conditions that can causes the PIE to raise an external interrupt;
- Local Status Register: containing bits respectively indicating status of functions in the PIE;
- Global Status Register: containing bits respectively indicating status of functions of all PIEs participating together in an operation.
- Timer Register: specifying an internal timer that increments every time unit; R/W Command Register: containing commands issued to the AoC for read write to cell locations; for example: 00000 causes to read SRAM Cell, 0000.1 causes to write SRAM Cell
- OC Command Register: containing commands issued to the AoC for execution of operation cycles.

The AoC registers 314 are used to program the operation of the AoC and include:

- AoC Address R/W Address Register: programmed to contain various kinds of addresses including cell addresses, AS Block address, Rib address, CWord address and OC Descriptor index;
- AoC Matched Cell Address Register: storing the address of the highest priority matched cell after an operation cycle;
- AoC Rib Alarm Condition Register: [also referred to as Alarm Condition rib Number Register] for storing the rib number of the highest priority cell that causes an alarm condition to be set;
- AoC Rib Statistic Register: [also referred to as statistic, rib Number Register] for storing the rib number of the highest priority cell that, causes a statistic counter to increment;
- OC Conductor Register: a 64-bit register to contain identifiers for OC descriptors that are used for running OCs without using Control RAM (CRAM). In particular, each identifier consists of 16 bits and the assignment of each bit is provided in detail below. Instead of identifiers, this register can also contain a control RAM address to decide which control RAM location to chose for running an OC.

HEE registers 316 are used to control the operations of Header Extraction Logic 332 and include a number of registers:

- HEE Status Register: including bits for packet attributes ready and packet header ready;
- HEE Packet Attribute Register: a register for storing packet attributes;
- HEE Packet Header Register: a, register for storing information regarding protocol and flag fields. This register is primarily used for supplying data needed for the main firewall OC;
- HEE Packet Header Threshold Register: storing offset at which the packet header ends. In other words, HEE stores the packet information as header until this offset and the rest is the packet data. In addition, the offset serves as, a threshold to start a second OC following the primary OC;
- HEE Packet Count Register: identifying the amount of bytes the HEE should read from the packet and store internally, namely, the total number of bytes read by the HEE;
- HEE Layer 3 Off vet Register: containing an offset from which the layer 3 header starts within the packet received by the HEE.

Packet Attributes & OC Conductor (OC Descriptor Identifiers or Control RAM Address)

Figure 5A:
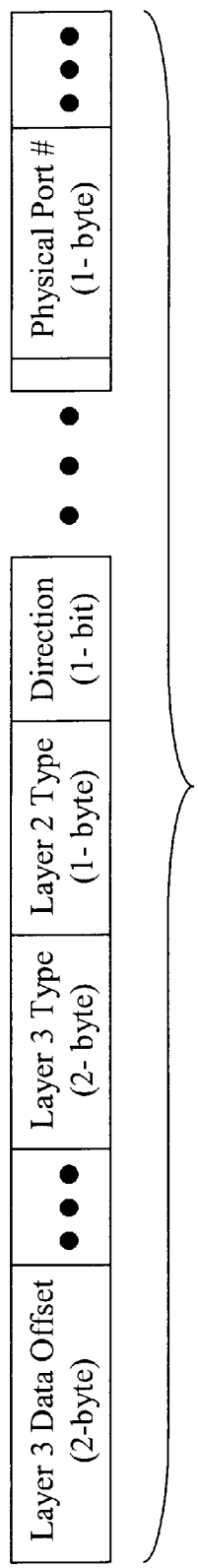
FIG. 5a illustrates an exemplary format of packet attributes (64 bits) received by the attribute register in a PIE.

Each packet has a number of associated attributes that are obtained to determine the manner of packet header extraction to run an operation cycle (OC). Typically, the packet attributes are supplied to the HEE 330 in the first 64 bits as shown in FIG. 5a and comprises the following:

- Layer 3 Offset (6 bits): These bits specify the offset within the packet where the Layer 3 IP Header starts.
- Packet Type Bits (3 bits): These bits identify whether the packet is an Ethernet or some other layer 2 type. They also identify that if the packet is a nonEthernet packet, whether the HEE should look at the layer 3 offset value to find out where the IP header starts.
- Direction (1 bit): This bit is an indicator of the direction in which the packet was received. A value of zero (0) means that packet was has come from a direction defined as "outside". A value of one (1) means that the packet was received from "inside".
- Enable Extraction (1 bit): This bit indicates whether the header extraction of the HEE will be turned on or off.
- OC Conductor Available (1 bit): This bit is used to find out the nature of the next 64 bits of data written to the HEE. If this bit is set, then the next 64 bits are assumed to be an OC conductor. Otherwise, the 64 bits are taken to be part of the actual packet data.
- User defined attributes (52 bits): These bits are user defined and the HEE does not interpret them. They are written directly to an internal register called the HEE packet attribute register.

The packet attributes are stored in HEE Attribute Register of the HEE registers 316. According to the arrangement shown in FIG. 5a, the first six bits of the 64 bits are the Layer 3 Data offset that dictates how the HEE interprets packet data. In essence, the amount of time the HEE needs to extract information depending on this offset.

Figure 5B:
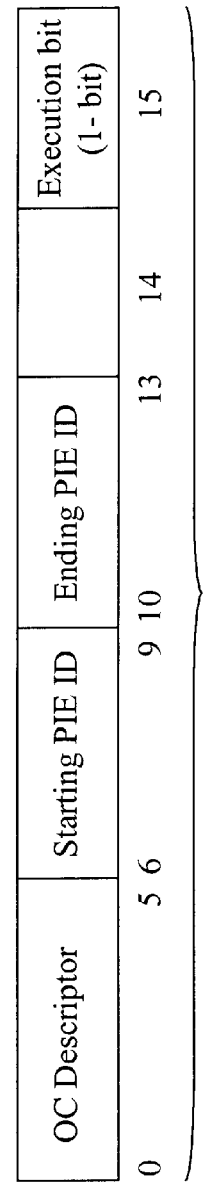
FIG. 5b illustrates an exemplary format of Operation Cycle (OC) Descriptor Indices (64 bits) received by the attribute register in a PIE.

Following the packet attributes, the next 64 bits are the OC Conductor that contain either four OC Identifiers or a Control Word Address either of which is used by the PIE to run OCs on the arrived packet. The 64 bits formed in a group of 016 bits each are stored internally. The four OC Identifiers; each of which is 16 bits, are illustrated in FIG. 5b. The 16 bits are interpreted as follows:

- OC Descriptor Index: These six bits are an OC Descriptor Index and specify the index of the descriptor in the OC Descriptor table that will be used for running the OC.
- PIE Selectors: These eight bits specify which range of the eight PIEs in a cascade arrangement will participate in the operating cycle (OC).

Execution Bit: The Identifier is used to run an OC if this execution bit is set.

The HEE can automatically trigger the start of OC execution by the chip. Subsequently the OCs are then controlled either using control words in control RAM (CRAM) or by using the next identifier in the group of four OC identifiers as shown in FIG. 5b two OCs within a PIE.

In a particular embodiment, the HEE has hardcoded logic for doing header extraction for IP packets. It assumes that each packet is an IP packet and the header information extraction is performed according to the packet format illustrated in FIGS. 2a and 2b.

Control RAM

Referring back to FIG. 3a, Control RAM Interface 380 couples the PIE 301 to Control RAM (CRAM) 390 through cascade bus 307. The CRAM 390 stores control information (i.e. Control Words or CWords) used to control the Array of Cells engine 300. According to one embodiment, the CRAM 390 is a 32-bit RAM that is organized into 256K segments of 32-bit words. In a system with 16 cascaded Packet Inspector Engines wherein each Packet Inspector Engine has 8K rules, there will be 128K rules. If each rule or cell needs one 64 bit CWords, that leads to segments having 128K of 64-bit CWords in each of these spaces. The segments identified in CRAM 390 is as follows:

Cell Operation CWord Segment: containing Operation CWords for each of the AoC cells, one 64 bit CWords per cell;

Non-Operation Cell C-Word Segment: containing operation CWords used by the PIE that may not be specific to the cells;

Data CWord Segment 0: containing information interpreted per cell, for example, Packet Counter (32 bit) and Byte Counter (32 bit);

Data CWord Segment 1: containing information interpreted per cell, for example, Timestamp (32 bit) and Rule State (8 bit); and User Segments: containing CWords that are not interpreted by the PIE.

In one embodiment, it is assumed that there are eight segments (four of the identified segments and four User Segments); with each segment having 128K CWords. The CWords are used for selecting and controlling an operating cycle (OC). The Operation CWords are accessed by both master and slave PIES for controlled operations.

FIG. 5c shows respectively the contents of a 64 bit Operation CWord. In one embodiment, the bits are allocated as follows:

OC Descriptor Index (6 bits): specifying what OC Descriptor to use in a PIE;

Starting PIE ID (4 bits): specifying the first one of the multiple PIES that are participating in the operating cycle (OC);

Ending PIE ID (4 bits): specifying the last one of the multiple PIES that are participating in the OC;

Branch Condition (4 bits) specifying branch condition that a PIE should execute;

Opcode-M (4 bits): specifying operations that are to be executed only by the master PIE;

Branch Offset: specifying the offset in case of a relative branch or a break condition;

Connection. Cword Validity (1 bit): implying a valid Data/Connection CWord associated with this Operation CWord if it is set;

Increment Byte Count (1 bit): indicating the PIE to increment the Byte Counter field of the Connection CWord (only Connection CWord Validity is set); and Update Timestamp (1 bit): indicating to update the Timestamp field of the connection CWord (only Connection CWord Validity is set).

Brach Address: This specifies the absolute address to jump to in case of a branch or a break condition.

Results Field: This field is for user defined results.

OC Descriptors

The OC Descriptors are preferably stored in the OC Command Register in the control a PIE and indexed using the OC Descriptor Index field in an Operation CWord stored in CRAM 390. The OC-Descriptors identify a particular portion of the Array of Cells (AoC) in a PIE that should participate in an OC. The fields in the OC Descriptors are specified as follows:

Row Start Address: (five-bit) specifying the Cell row from which the OC should start;

Row End Address: (five-bit) specifying the Cell row at which the OC should end;

Rib Start Address: (four-bit) specifying the starting rib number;

Rib End Address: (four bit) specifying the ending rib number;

Opcode: (four bit) specifying the operation that should be executed by the PIE;

Data Source: (two-bit) specifying the date source for running the OC, for example:
00—HEE Packet Attribute Register;
01—HEE Packet Header Register;
10—HEE Packet Data Register;
11—AoC Data Register Set;

Data Search Starting Offset: (nine bit) specifying the offset in the packet from which the data search OC should start;

Number of Bytes to Search: (four bit) specifying the number of bytes of the packet to be searched.

Operation of AoC

Figure 6A:
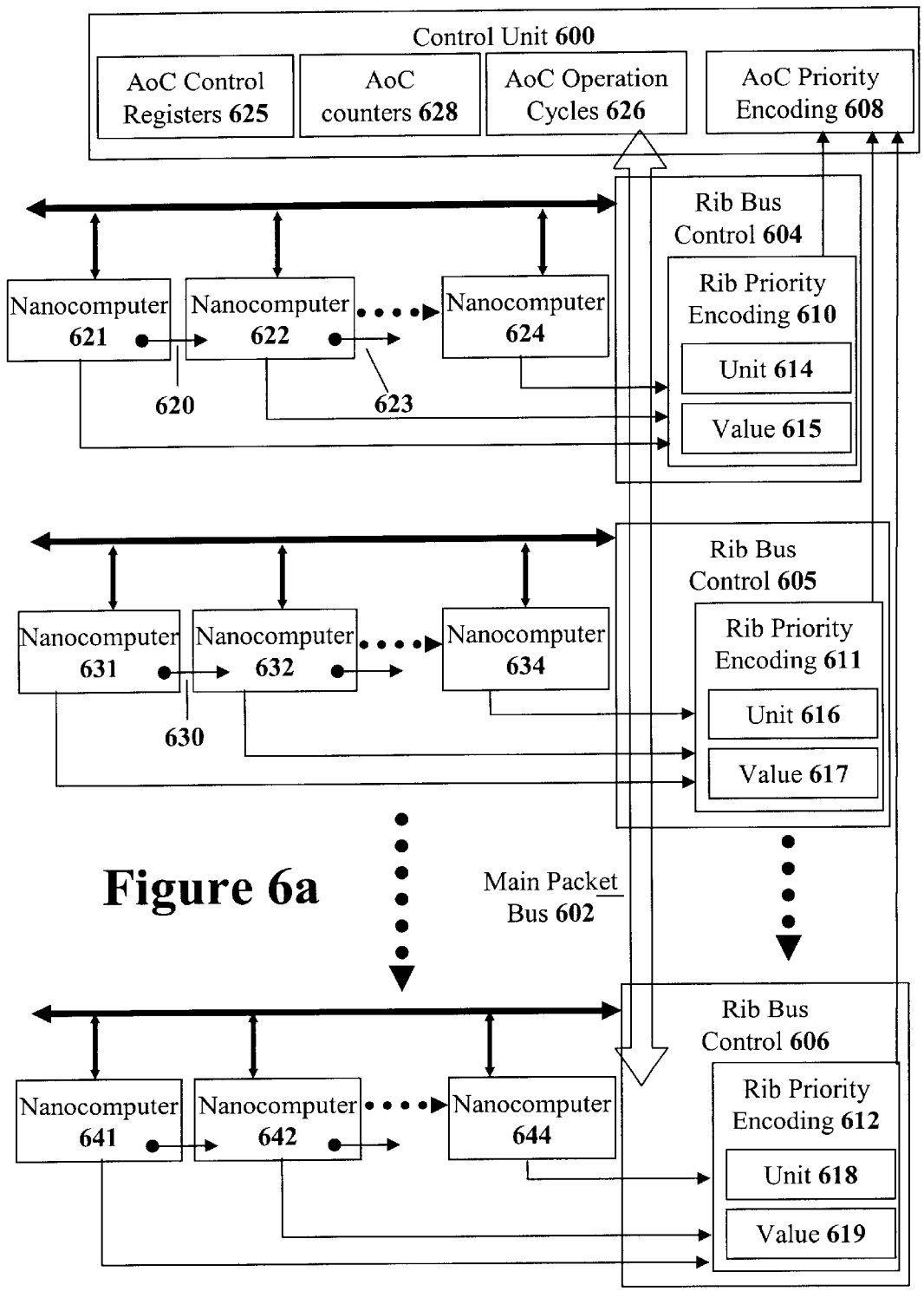
FIG. 6a shows a block diagram of one possible embodiment of an array of nanocomputers.

To fully understand the present invention, it is deemed necessary to understand the operations of the Array of Cells 400 depicted in FIG. 4a. The control unit 410 exercises overall control of the Array of Cells 400 by downloading rule information into the individual cells within each nanocomputer through the main packet distribution bus 417. Each rib control unit on the main packet distribution bus 417 receives downloaded information and passes that information to the appropriate nanocomputers located on the rib control unit's associated rib bus. FIG. 6a presents a conceptual block diagram that provides more detail. Each nanocomputer that receives downloaded information stores that information into the appropriate rule entries in the nanocomputer's memory.

The Array of Cells processes a data packet by sending the packet down the main packet distribution bus 602 along with command information that describes the type of operation that should be performed and a description of the nanocomputer cells that should participate in the processing. Each rib control unit (604, 605, . . . , 606) on the main packet distribution bus 602 receives packet information and associated command information. Each rib control unit then passes that packet and command information to the appropriate nanocomputers located on the rib control unit's associated rib bus. Each selected nanocomputer then processes the packet information with the appropriate rules to generate results. All of the nanocomputer processing occurs in parallel such that an entire array of cells can concurrently process a single data packet.

Prioritization Logic

When the results of an Array of Cells operation are to be reported, the operation results are reported back to the control unit 600 using the inherent cell priority system. Specifically, each nanocomputer determines its highest priority cell result and reports to the local rib priority encoding logic in the local rib bus control unit. The local rib priority encoding logic selects the results from the highest priority report nanocomputer coupled the local rib bus and stores that result. Finally, an AoC priority encoding logic 608 in the main control unit 410 will retrieve the result from the highest priority rib bus control unit that reports.

To achieve this result, each rib priority encoding logic (610, 611 . . . , 612) in each rib bus control unit (604, 605 . . . , 606) determines the highest priority match among its' nanocomputers and maintains this nanocomputer unit's value and stores it in a register. (614, 616, . . . , 618). Some operations may output a resultant value. To store the most significant resultant value from the nanocomputers on the local rib bus, each rib priority encoding logic (610, 611, . . . , 612) further includes a value register (615, 617. . . , 619). The AoC priority encoding logic 608 in the main control unit 600 will read the various value registers (615, 617, . . . 619) to select the highest priority value.

The Nanocomputer (or AS-Block)

Each nanocomputer comprises a simple complete computer system. Specifically, each nanocomputer contains all the basic elements of a computer system, including input & output circuitry, a memory unit (often a SRAM) for storing instructions (rules), several arithmetic logic units (ALUs), and a control circuit for reading and processing the instructions. Since the main features in one nanocomputer embodiment are the ALUs and SRAM (for storing rules), the nanocomputer is also known as an ALU-SRAM block or AS-block.

The Nanocomputer (or AS Block) Architecture

Figure 6B:
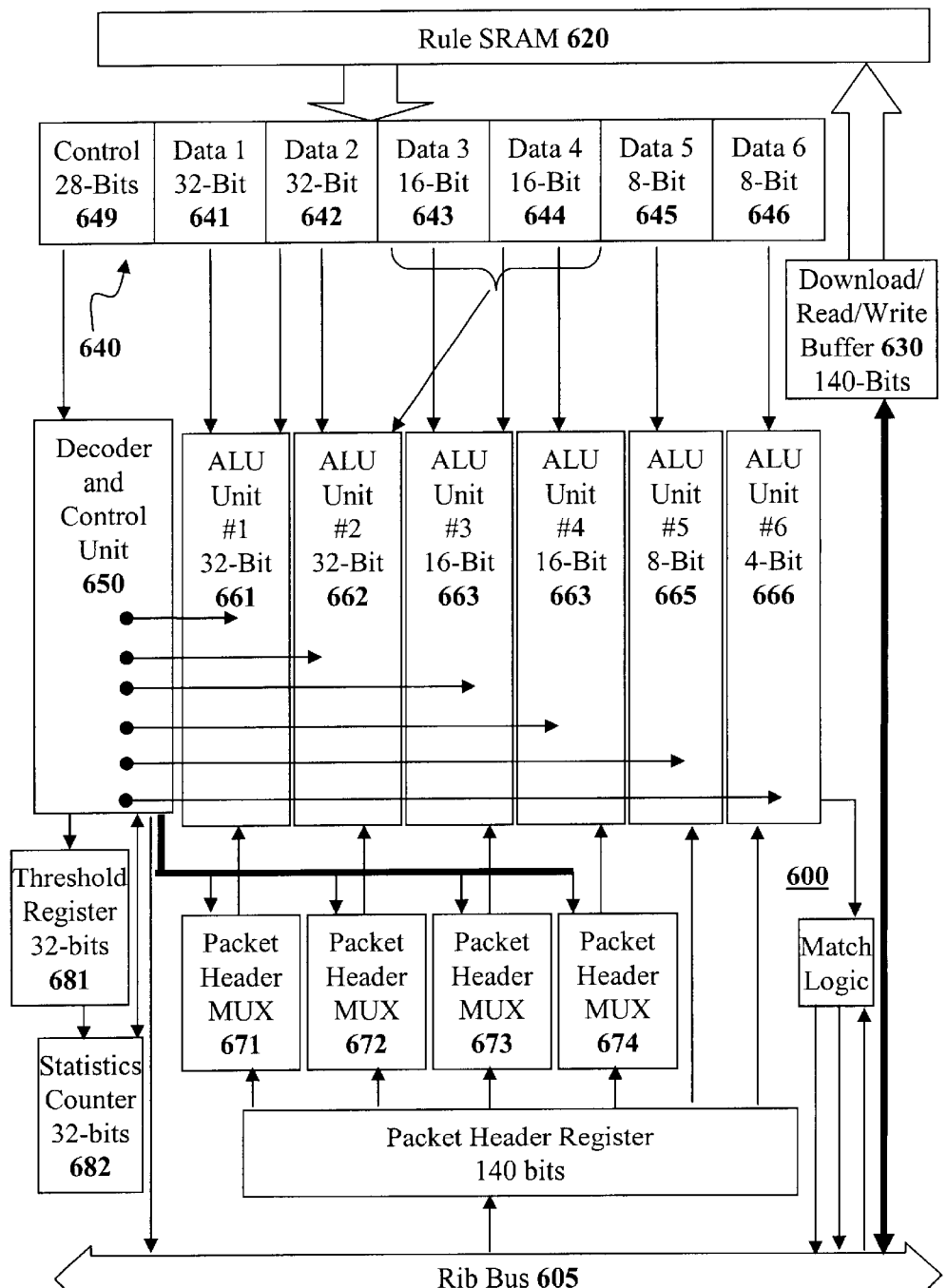
FIG. 6b illustrates one possible embodiment of an individual nanocomputer.

FIG. 6b illustrates a detailed block diagram of one possible embodiment of a nanocomputer 600. Referring to FIG. 6b, the nanocomputer receives input information and sends output information through a bus 605. The bus 605 is the rib bus to which the nanocomputer is coupled. The information received from the bus 605 may be passed to a download/read write register 630. The download/read write register 630 may temporarily store downloaded rule information before such information is stored into the random access memory (RAM) unit 620.

The random access memory (RAM) unit 620 stores the instruction and data information (rules) that will be processed. As previously stated, in one embodiment the random access memory (RAM) unit 620 contains thirty-two entries for storing rules. In the embodiment of FIG. 4a, each rule entry is one hundred and forty bits wide. However, nanocomputers can be constructed using different rule sizes. In one embodiment, the random access memory (RAM) unit 620 is constructed using static random access memory (SRAM) technology.

The rules in the random access memory (RAM) unit 620 are latched into a rule register 640. In the embodiment of FIG. 6b, the rule register 640 passes a twenty-eight bit instruction word to a decoder and control unit 650 from the twenty-eight bit control portion 649. The remaining one hundred and twelve bits are split into six data fields 641, 642, 643, 644, 645, and 641. The data fields store the data information that is passed to the six different arithmetic and logic units (ALUs) 661 to 666. Again, it must be noted that the rule format disclosed in FIG. 6 and following figures represents only one possible rule format.

The nanocomputer's decoder and control unit 650 decodes the twenty-eight bit instruction and controls the operation of the six ALUs and the multiplexors that provide data to the ALU. The decoded instruction determines how the arithmetic logic units will process the data. Details on the format of the twenty-eight bit instructions will be disclosed in a later section.

The six different arithmetic and logic units (ALUs) 661 to 666 in the embodiment of FIG. 6b operate on the one hundred and twelve bits of data information from the rule retrieved from the rule RAM 620 and information retrieved off the bus 605. Under control of the decoder and control unit 650, the six arithmetic and logic units (ALUs) 661 to 666 perform comparison and arithmetic operations to produce a result.

In the embodiment of FIG. 6b, the first two ALUs 661 and 662 operate on thirty-two bit data units. In the normal Internet packet filtering application, the first two ALUs 661 and 662 operate on the source and destination Internet Protocol (IP) addresses retrieved from IP packet headers off the bus 605. However, these first two ALUs 661 and 662 may operate on other packet data fields or other data types in other applications. In such other applications, the proper data must be supplied to the packet inspector engine such that data appears on bus 605. Associated multiplexors 671 and 672 are then used to direct the proper data field from the bus 605 into ALUs 661 and 662.

In most operations, ALU 661 operates only on reference data from the data field 641 and packet data retrieved from the bus 605. However, in certain operations, such as masked operations, require three input values. For masked operations, the ALU 661 operates on reference data from the data field 641, packet data from the bus 605, and mask data from the adjacent data field 642. Similarly, ALU 662 normally operates on reference data from data field 642 and packet data from the bus 605, however ALU 662 may also incorporate a thirty-two bit value from data fields 643 and 644.

The next two ALUs 663 and 664 in the embodiment of FIG. 6b are sixteen-bit wide ALUs. In many cases, ALUs 663 and 664 are used to process source and destination TCP ports retrieved from TCP packet headers. However, ALUs 663 and 664 may operate on other data fields such that associated multiplexors 673 and 674 are needed to direct the proper data field from the bus 605 into ALUs 663 and 664. Out of these two 16-bit ALUs, only ALU 663 requires mask information from data field 645. ALU 664 operates only on reference data from the data field 641 and packet data retrieved from the bus 605. There is no mask information provided to ALU 664.

The fifth ALU, ALU 665, is usually used to examine the protocol field in TCP packet headers. Since the fifth ALU always examines the same data field, no multiplexor is needed. Similarly, the final ALU, ALU 666, always examines the same four flag bits in packet headers. Specifically, ALU 666 examines the SYN, Ack, and Fin flag bits from packet headers. A direction flag (DIR) is supplied by the network port controller (NPC) or the Network Interface Control (NIC) which receives and transmits packets between its ports. The direction flag usually specifies an inbound or outbound direction for a packet. ALU 666 also examines four enable/disable bits for each of the four flag bits examined.

When the arithmetic logic units have completed their processing the operation output may be sent out on the bus 605. Alternatively, for rules that maintain a state, the output may be placed back into the RAM 620 through the write-back register 630.

The Rules Stored in the Nanocomputer (or AS Block)

As set forth in the previous section, the rule SRAM 620 in the nanocomputer 600 stores rule information. In one embodiment, the rule information is stored with a twenty-eight bit coded control word portion and a one hundred and eight bit data portion. The twenty-eight bit coded control word determines how the ALUs will interpret the one hundred and eight bit data portion of the rule entry.

The following table lists one possible subset of data field formats that may be used for packet classification operations such as IP Routing, Firewall packet filtering, and QoS Classification.

one embodiment of encoding the control portion of a rule for packet filtering applications.

Figure 7G:
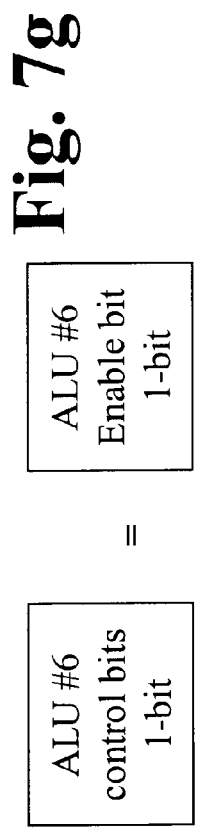

FIG. 7a illustrates the contents of all the twenty-eight bits in one possible encoding of the rule control word portion. Referring to FIG. 7a, the rule control word is divided into seven different sections. The first six sections specify how the six different ALUs in the nanocomputer will operate. The seventh section specifies a set of four control bits common to all rule control words. Each rule control word section will be described individually in FIGS. 7b to 7h.

Referring to FIG. 7b, the ALU #1 section for the first thirty-two bit ALU 661 has five control bits. The first three bits specify the operation that will be performed by the ALU. Specifically, the first three bits specify if the ALU 661 will perform an equal comparison, a greater-than comparison, a less-than comparison, force a "Match" for this ALU, force a "No Match" operation, Min operation or a Max operation. The fourth bit specifies if the first 32 bit ALU should use the thirty-two bit mask value in second data field when performing the specified operation. The fifth bit specifies how the multiplexor 671 for ALU 661 should be controlled. A "1" specifies the Source IP address from the bus 605 and a "0" specifies the destination IP address from bus 605.

Referring to FIG. 7c, the ALU #2 section for the first thirty-two bit ALU 662 has four control bits. Out of these four bits, two are used to specify the operation to be

TABLE 1

| Data field 1 | Data field 2 | Data field 3 | Data field 4 | Data field 5 | Data field 6 |
|---|---|---|---|---|---|
| SIP[32] | DIP[32] | SP[16] | DP[16] | Protocol[8] | Flags/enable[8] |
| SIP[32] | SPDP[32] | SPM[16] | DPM[16] | Protocol[8] | Flags/enable[8] |
| DIP[32] | SPDP[32] | SPM[16] | DPM[16] | Protocol[8] | Flags/enable[8] |
| SIP[32] | DIP[32] | SP[16] | SPM[16] | Protocol[8] | Flags/enable[8] |
| SIP[32] | DIP[32] | DP[16] | DPM[16] | Protocol[8] | Flags/enable[8] |
| SIP[32] | SIPM[32] | SP[16] | DP[16] | Protocol[8] | Flags/enable[8] |
| DIP[32] | DIPM[32] | SP[16] | DP[16] | Protocol[8] | Flags/enable[8] |
| SIP[32] | SIPM[32] | SP[16] | SPM[16] | Protocol[8] | Flags/enable[8] |
| SIP[32] | SIPM[32] | DP[16] | DPM[16] | Protocol[8] | Flags/enable[8] |
| DIP[32] | DIPM[32] | SP[16] | SPM[16] | Protocol[8] | Flags/enable[8] |
| DIP[32] | DIPM[32] | DP[16] | DPM[16] | Protocol[8] | Flags/enable[8] |
| SIP[32] | DIP[32] | DIPM_lo[16] | DIPM_hi[16] | Protocol[8] | Flags/enable[8] |
| SIP[32] | SIPM[32] | DIP_hi[16] | DIP_lo[16] | Protocol[8] | Flags/enable[8] |

Wherein:
SIP = Source IP address
DIP = Destination IP address
DIP_hi = 16 high bits of a Destination IP address
DIP_lo = 16 low bits of a Destination IP address
SIPM = Source IP address Mask
DIPM = Destination IP address Mask
DIPM_lo = 16 low bits of a Destination IP Mask
DIPM_hi = 16 high bits of a Destination IP Mask
SP = Source TCP Port
DP = Destination TCP Port
SPDP = A concatenated Source TCP and Destination TCP port
SPM = Source TCP port Mask
DPM = Destination TCP Port mask
Protocol = The eight protocol bits in a TCP header
Flags/enable = The SYN, Ack, Fin and DIR flag bits and associated enable/disable bits The data field formats of Table 1 provide a good set of permutations of various packet header fields that are most often used for firewall packet filtering.

However, the limited set of Table 1 is not exhaustive. Many other permutations exist and other packet header fields may be examined.

The coded control word portion of a rule determines which of the data field formats in Table 1 will be used. The coded control word portion of a rule may be coded in a variety of different manners. FIGS. 7a through 7h illustrate performed by ALU #2—an Equal compare, a Greater-Than compare, a Less-Than compare, or force a "Match" operation. The third bit specifies whether the mask information is to be used or not. The fourth bit specifies how the multiplexor 671 is controlled. A "1" specifies the destination IP (DIP) address from the bus 605 and a "0" specifies a concatenated source TCP port and destination TCP port from bus 605.

FIG. 7d describes the five control bits for the first sixteen-bit ALU, ALU 663. The first two bits specify the operation that will be performed by ALU 663 in the same manner as the thirty-two bit ALUs. Specifically, the first two bits specify if the ALU 663 will perform an equal comparison, a greater-than comparison, a less-than comparison, or force a "Match" operation. The next bit specifies if the mask value from the fourth data field should be used when performing the comparison. The final two bits specify how the multiplexor 673 routes information from the bus 605 into ALU 663. In one embodiment, the packet routing (multiplexor 673 control) bits specify if a source TCP port, a destination TCP port, or the upper sixteen bits of a destination IP address is routed into ALU 663.

FIG. 7e describes the five control bits for the second sixteen-bit ALU, ALU 664. The first two bits specify the arithmetic or logical operation that will be performed by ALU 663 in the same manner as the first four ALUs. The next two bits specify how the multiplexor 674 routes information from the bus 605 into ALU 664. In one embodiment, the packet routing (multiplexor 674 control) bits specify if a source TCP port, a destination TCP port, or the lower sixteen bits of a destination IP address is routed into ALU 664. The final control bit for ALU 664 specifies if the two sixteen-bit ALUs (ALU 663 and ALU 664) should merged together such that the two sixteen-bit ALUs act as one thirty-two bit ALU.

Referring to FIG. 7f, the fifth ALU, ALU 665, has only one control bit. That single control bit specifies if ALU 665 should be enabled. Similarly, FIG. 7g depicts that ALU 666 also only has a single control bit used to enable or disable ALU 666. However, it should be noted that data field 646 for ALU 666 also includes four enable/disable bits that will specify if the various flags examined by ALU 666 should be considered.

Figure 7H:
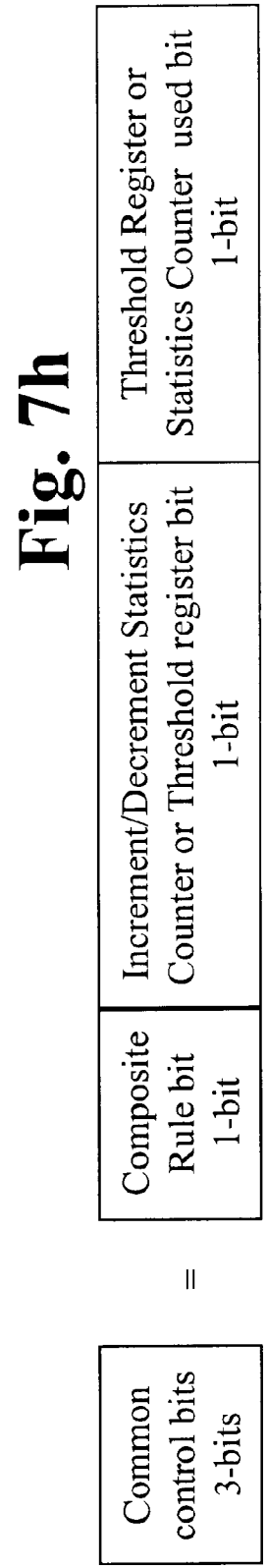

FIG. 7h specifies the common control bits for all control words. The first bit specifies if the rule is a composite rule. Composite rules are described in the following section. The second rule bit of the common control bits is the increment/decrement statistics counter. The increment/decrement bit specifies if the statistics counter should be incremented or decremented if the rule matches. The third bit specifies if the statistics counter or the threshold register is being used Statistics & Alarms Referring back to FIG. 6b, each nanocomputer includes a threshold register 681 and statistics counter 682. The statistics counter 682 is used to count the number of times a particular rule or set of rules, are satisfied. It is possible to either increment the statistics counter 682 up from zero and compare it with the threshold register 681 or load the statistics counter 682 with the value in the threshold register 681 and then decrement the statistics counter 682 down to zero.

The threshold register 681 and statistics counter 682 may be used for many different purposes. Two common uses for the threshold register 681 and statistics counter 682 are to: (1) provide packet classification and statistics collection; and (2) raise alarms when an attack on the network's security is suspected.

Packet classification and Statistics collection is performed by counting the number of packets received per "class". A class being defined by the firewall rules being activated by a match or "hit."

The threshold register 681 and statistics counter 682 may be used to raise an alarm when an attack is suspected. An attack may be suspected when the Packet Inspector Engine senses a number of packets of a particular type or "class" that are received in a specified time period (a sampling window) exceeds a pre-configured Threshold value. In response to such attack scenarios, the Packet Inspector Engine can be used to assert an alarm signal.

The two applications for using the threshold register 681 and statistics counter 682 functionality present in the AoC are provided only as examples. Many other methods of using the threshold register 681 and statistics counter 682 functionality exist.

The Threshold Register and a Statistics counter in each nanocomputer are thirty-two bits wide. The Threshold Register is used to hold a threshold value, which is loaded into the Statistics counter periodically for all nanocomputers in the Array of Cells block. The period over which the Alarms conditions are evaluated is referred as the "sampling window" and is set by the user or rule manager. After the sampling window has elapsed, statistics counters in all nanocomputers reload the threshold value in a decrementing usage.

The statistics counters can be incremented up from zero or decremented from the threshold value loaded from the threshold register. There are common rule control bits present in the RAM rule entry to control the statistics counters. The "Enable Statistics" bit is used to enable the statistics counter for a particular RAM rule entry and the "Increment/Decrement" bit is used to select between the increment operations.

In a sampling window, statistics counters in the various nanocomputers are updated if a "Match" occurs and the corresponding statistics enabled bit is set. This incrementing or decrementing takes place over multiple cycles in a single sampling window. If, during a sampling window, any statistics counter underflows or overflows, then the corresponding Packet Inspector chip asserts an alarm signal.

Any alarm raised in a -particular sampling window may or may not be addressed by the external port processor (MP). The only function that the Packet Inspector Engine does is to inform the external port processor (MP) of any such alarms detected and continue its operations.

Composite Rules

Although the firewall rule format described in FIGS. 7a through FIG. 7h has been design to accommodate the majority of typical firewall rule condition parameters, there will be some more complex rules that cannot be expressed within the confines the single 28-bit control word and 112-bit data field of each rule cell. A rule may require a multiple comparisons on the same packet data fields such that the same data field would need to be distributed to more than just one arithmetic unit.

To handle more the more complex firewall rules, the Array of Cells engine has been designed such that firewall rules may be expanded. Composite rules allow for additional data field comparisons by combining the results of up to four (or less) rules and presenting the overall result in the same processing cycle, as any other single (non-composite) rule.

To handle more the more complex firewall or classification rules, the array of cells engine has been designed such that rules may be expanded by means of "composite rules". Composite rules allow for additional data field comparisons by combining the results of up to four (or less) rules and presenting the overall result in the same processing cycle, as any other single (non-composite) rule. A composite rule can be formulated over rules present in adjacent nanocomputers, belonging to the same rib and present in the same row of RAM cells.

Composite rules are used to perform complex comparisons on a limited number of data packet fields in a single cycle. These rules operate by linking together the processing capabilities of adjacent nanocomputer units. Referring back to FIG. 6a, each nanocomputer is linked to the adjacent nanocomputer with a "next match" output signal being given to a "previous match" input signal. For example, next match signal 620 of nanocomputer 621 is connected to the previous match signal of nanocomputer 622. The next match signal informs the adjacent nanocomputer if a rule match has been detected in the previous nanocomputer. Thus, in FIG. 6a, if a match occurs in nanocomputer 621 then the next match signal 620 is asserted such that nanocomputer 622 is notified when nanocomputer 621 has a rule match.

To create a composite rule, a nanocomputer is informed that it should not assert its match signal going the rib bus control unit. Instead, the nanocomputer only asserts the next match signal when a match occurs. The last nanocomputer in a series of linked nanocomputer asserts its match signal if that nanocomputer detects a match and all the other nanocomputers in the linked series detect a match. The last nanocomputer in a composite rule always asserts its next match signal high for the next nanocomputer.

Figure 8:
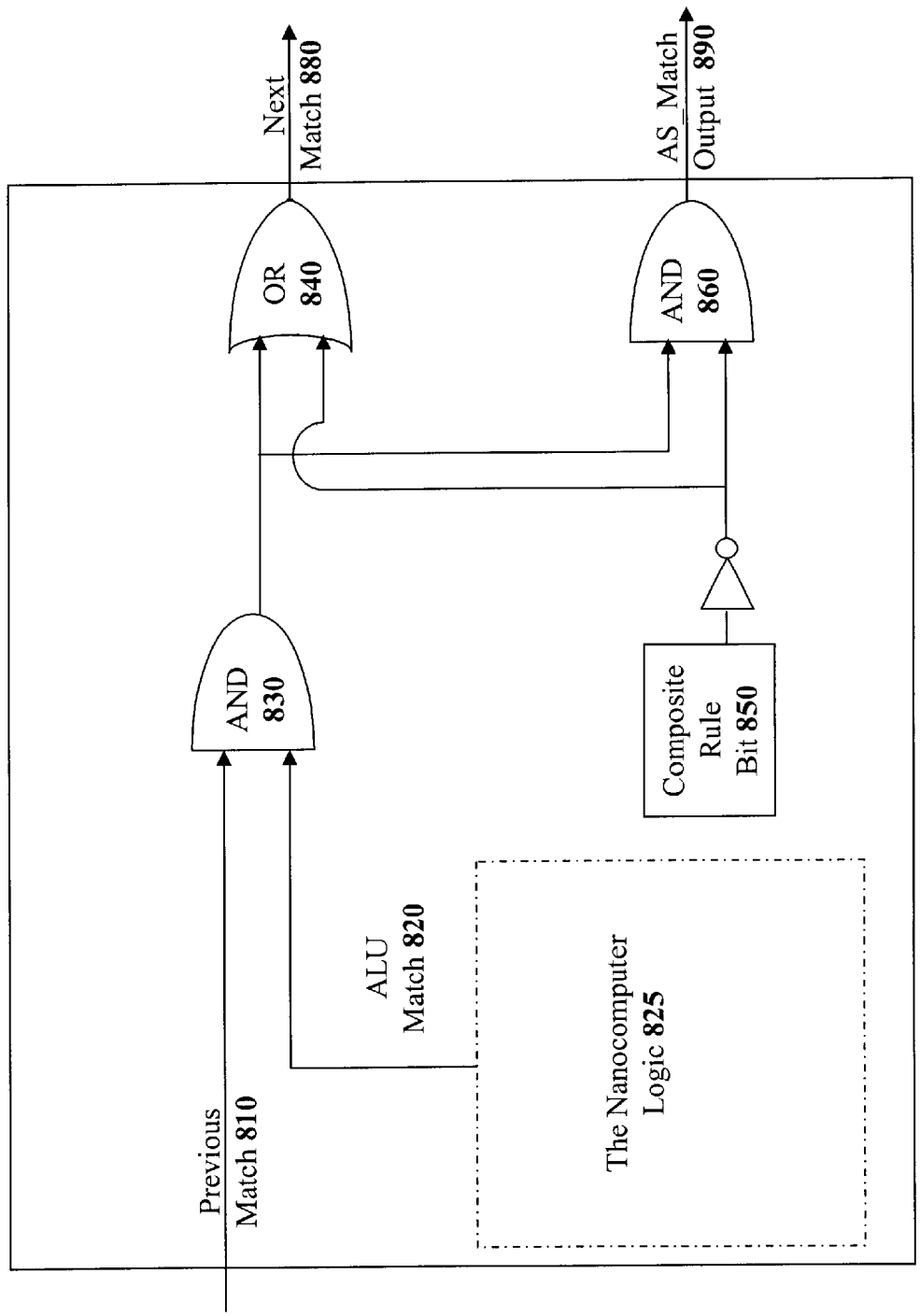
FIG. 8 illustrates one embodiment of circuitry that allows for composite rules using multiple nanocomputers.

FIG. 8 illustrates one possible logic embodiment for the composite rule logic that resides in each nanocomputer. Referring to FIG. 8, each nanocomputer unit includes a composite rule bit 850 that specifies if the nanocomputer is in the beginning or middle of a composite rule. When the composite rule feature is not being used, the composite rule bit 850 is clear in every nanocomputer. However, when the composite rule feature is being used, all of the nanocomputers in a composite rule have their composite rule bit set except for the last nanocomputer in the composite rule series. For example, in a four nanocomputer wide composite rule, the first three nanocomputers will have set their composite rule bits. Only the final (end) nanocomputer will have this bit clear. In addition, any other single rule that is not a part of a composite rule will have the composite rule bit clear. The composite rule bit determines how the next match 880 and AS_match 890 output signals will operate.

When the composite rule bit 850 is clear, the nanocomputer will output a AS_match signal on match output 890 that specifies if the nanocomputer detects a match (ALU_Match 820) AND the previous nanocomputer specifies a match (previous match 810). Furthermore, when the composite rule bit 850 is clear, the next match signal 880 will be always be asserted. Thus, by asserting the next match signal 880 at the end of each rule, the next nanocomputer's output will only depend on its own match determination. The table below explains the output of match signals based on the previous match signal as well as other relevant signals.

TABLE 2

| Input Signals | | | Outputs Signals | |
|---|---|---|---|---|
| Composite Bit 850 | Previous Match 810 | ALU_Match 820 | AS_Match 890 | Next Match 880 |
| 1 | 0 | 0 | 0 | 0 |
| 1 | 0 | 1 | 0 | 0 |
| 1 | 1 | 0 | 0 | 0 |
| 1 | 1 | 1 | 0 | 1 |
| 0 | 0 | 0 | 0 | 1 |
| 0 | 0 | 1 | 0 | 1 |
| 0 | 1 | 0 | 0 | 1 |
| 0 | 1 | 1 | 1 | 1 |

Composite bit is reset for all single rules and the highest priority rule in a composite rule.

AS_Match is always low for rules in the beginning or middle of a composite rule set. For all other rules, it depends on the ALU_Match and the Previous Match signals.

AS Match=(Previous Match AND ALU_Match) AND (NOT Composite Rule Bit).

Next Match is always high for single rules and the highest priority rule in a composite rule set. For all other rules, this depends on the ALU_Match and the Previous Match signals Next Match=(NOT Composite) OR (Previous Match AND ALU Match)

When the composite rule bit 850 is set, the nanocomputer will not assert match signal on the match output signal 890. Instead, the nanocomputer will only send the logical ANDed combination of its own match determination 820 and the match determination from the previous nanocomputers in the composite series, previous match 810. Thus, when the composite rule bit 850 is set, only the next match signal is valid and its own match signal is low.

OC Sequencing

The PIE is capable of running different Operating Cycles on the same packet data. This is done by either using a fixed number of OC Identifiers or it is accomplished by using sequencing information available in Control RAM Operation C-Words. The sequencing done using CRAM C-Words provides greater power and flexibility.

Following the first 64 bit Packet Information, the subsequent 64 bit data field can be a Packet OC Conductor. The OC Conductor either contains a C-Word Address or can contain four 16 bit OC Identifiers. The PIE has an on chip OC Conductor Register that contains information organized exactly as the OC Conductor received through the HEE interface. If no OC Conductor is specified with a packet then the OC Conductor value stored in this register used by default. If the OC Conductor comes with the packet via the HEE, then the register value is ignored.

Sequencing using OC Identifiers

As previously set forth, each OC Identifier consists of 16 bit that are interpreted as follows:

OC Descriptor Index: These six bits are an OC Descriptor Index and specify the index of the descriptor in the PC Descriptor table that will be used for running the OC.

PIE Selectors: These eight bits specify which range of the eight PIEs in a cascade arrangement will participate in the operating cycle (OC).

Execution Bit: The Identifier is used to run an OC if this execution bit is set.

If the OC Conductor specifies that it contains OC Identifiers then the first Identifier is always run.

Each OC Identifier thus identifies the chips in the cascade that will participate in the OC and for all the participating chips it specifies the descriptor that each chip will use.

The PIE chip executes the four OC Identifiers one by one and on completion of the last OC, the PIE chip terminates packet processing on the current packet data. Thus using OC Identifiers, a maximum of only four OCs can be executed on packet data. The Operation CWords in Control RAM are not used.

Sequencing using Control RAM

The CRAM has two segments, which stores Operation C-Words. Each Operation C-Word contains a field that is similar to the OC Identifier and is used for running an OC. It contains a Branch Condition and finally a branch address (which is used for certain branch Opcode and ignored for others).

The OC Conductor (either stored in the OC Conductor Register or coming via the HEE) can specify a Control Word Address instead of OC Identifiers. If it specifies a C-Word address then the C-Word at that address is fetched and is interpreted as an Operation C-Word. An OC is run using the OC Identifier field in the C-Word. After completion of the OC, the next C-Word to choose for execution depends on the Branch Condition specified in the Branch Opcode. The following branch conditions are possible:

Unconditional Branches:
  a) Continue
  b) Terminate
  c) Goto C-Word Address
  d) Call C-Word Address
  e) Return Conditional Branches:
  f) Goto Matched Cell C-Word Address else Continue
  g) Call Matched Cell C-Word Address else Continue
  h) Goto Matched Cell C-Word Address on Match else Terminate
  i) Call Matched Cell C-Word Address on Match else Terminate
  j) Goto Matched Cell C-Word Address on Match else Goto C-Word Address
  k) Call Matched Cell C-Word Address on Match else Call C-Word Address After executing the operating cycle (OC), the PIE examines the branch Opcode.
  a) If the Opcode is Continue, then the PE fetches the C-Word at the following address and executes that.
  b) If the Opcode is Terminate, then the PIE stops further OC execution and assumes that packet processing for the current packet data is complete.
  c) If the Opcode is Goto C-Word Address then the PIE fetches the C-Word whose address is specified in the Branch Address Field of the current C-Word and executes the fetched C-Word
  d) If the Opcode is Goto Matched Cell C-Word Address else continue then it indicates a conditional branch condition. If the current OC produced a match, then the Operation C-Word corresponding to the C-Word which matched is fetched and executed. If the C-Word did not produce any match then by default the C-Word at the location following the current location is fetched and executed.
  e) If the Opcode is Goto Matched Cell C-Word Address else Terminate then action is taken as in defined in the previous item above on a Match, but if the Match fails then the OC Sequence is terminated and further packet processing is stopped.
  f) If the Opcode is Goto Matched Cell C-Word Address else Goto C-Word Address then action is taken as in defined in the previous item above on a Match, but if the Match fails then the C-Word whose address is specified in the Branch Address field is fetched and executed.
  g) The PIE can store a single C-Word address to be used as a return address. This acts like a single entry last-in/first-out (LIFO) stack. If any Branch Opcode is a Call Opcode, then address of the current C-Word is stored, in this single entry stack. On encountering any Return Opcode thereafter, the PIE returns to executing the C-Word just after the address stored in the one entry stack. As the stack is single entry it implies that if two Call Opcodes occur without any intervening Return then the second Call will cause the stack entry to be overwritten with the address of the C-Word storing the second Call.

Quality of Service Scheduling in the Array of Cells Engine

One task that must be performed by many network devices is providing quality of service (QoS) classification and scheduling. In a network device that provides quality of service classification/scheduling, incoming packets are sorted based upon a defined priority system. The network device then places the sorted packets into different service queues that are used to provide varying quality of service levels. These service queues are sometimes known as quality of service (QoS) queues. A scheduler then services the different QoS queues at different intervals to provide each queue with an appropriate level of service.

Figure 9:
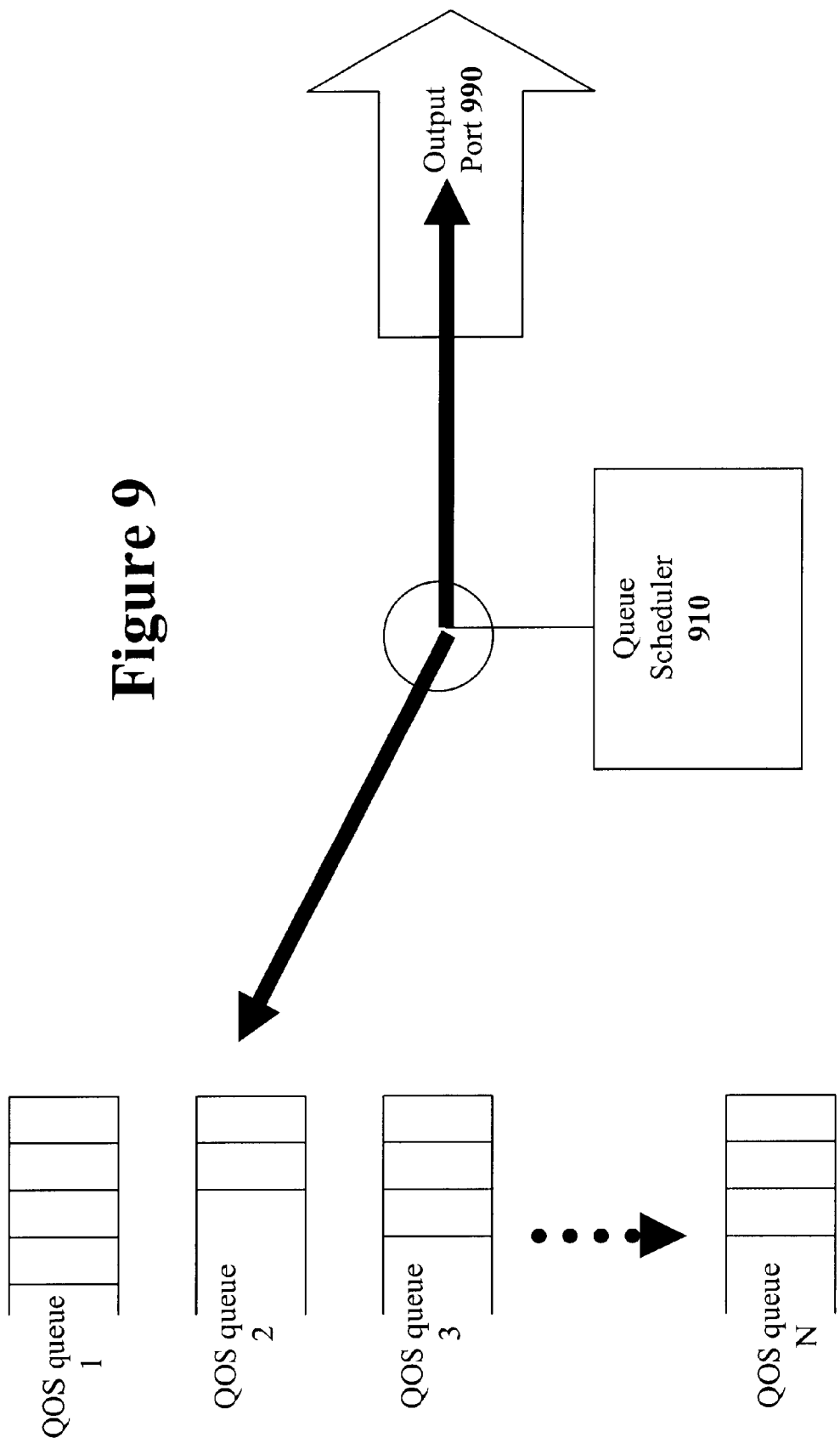
FIG. 9 illustrates a conceptual diagram of a QoS queue based packet scheduler.

FIG. 9 illustrates a conceptual diagram that describes the task that must be performed by a packet scheduler. In the illustration of FIG. 9, there are N QoS queues that contain data packets that need to be transmitted out of an output port 990. Each of the N QoS queues is assigned a certain amount of the outgoing port's bandwidth. When the scheduler 910 services a particular queue, the scheduler 910 fetches a data packet from the head of the QoS queue and transmits the data packet through the outgoing port 990. The scheduler 910 schedules each of the QoS queues at appropriate intervals such that all of the QoS queues are properly served. Specifically, the scheduler 910 accesses each QoS queue at a sufficient frequency such that each QoS queue receives its allocated bandwidth.

An Interval Based Packet Scheduler

To properly schedule each QoS queue, one common approach is to use an assigned service interval for each QoS queue. The service interval is an interval time that may pass between each time the particular QoS queue is serviced. The service interval is generally proportional to an inversion of the assigned bandwidth for that QoS queue. The ideal service interval defines a maximum amount of time that may elapse between cells for a given queue being scheduled.

To implement an interval based packet scheduler, the scheduler 910 creates a next time to send (NTTS) variable T(i) for each QoS queue i where i=1 to N. The NTTS variable T(i) for each QoS queue specifies a relative time when the QoS queue should be serviced next. The scheduler 910 then assigns a service interval value I(i) to each QoS queue. As previously set forth, the service interval value I(i) is generally proportional to an inversion of the bandwidth assigned to that QoS queue.

The NTTS variable T(i) for each QoS queue is first initialized with the assigned service interval I(i) for that QoS queue. The scheduler 910 then begins servicing the queues by selecting a QoS queue j having the smallest service time T(j). This queue j is serviced and the service time T(j) is incremented using the QoS queue's assigned service interval I(j). The scheduler then looks for the next QoS queue having the smallest NTTS variable T(i) such that queue, may be serviced and have its NTTS variable T (i) updated.

Figure 10:
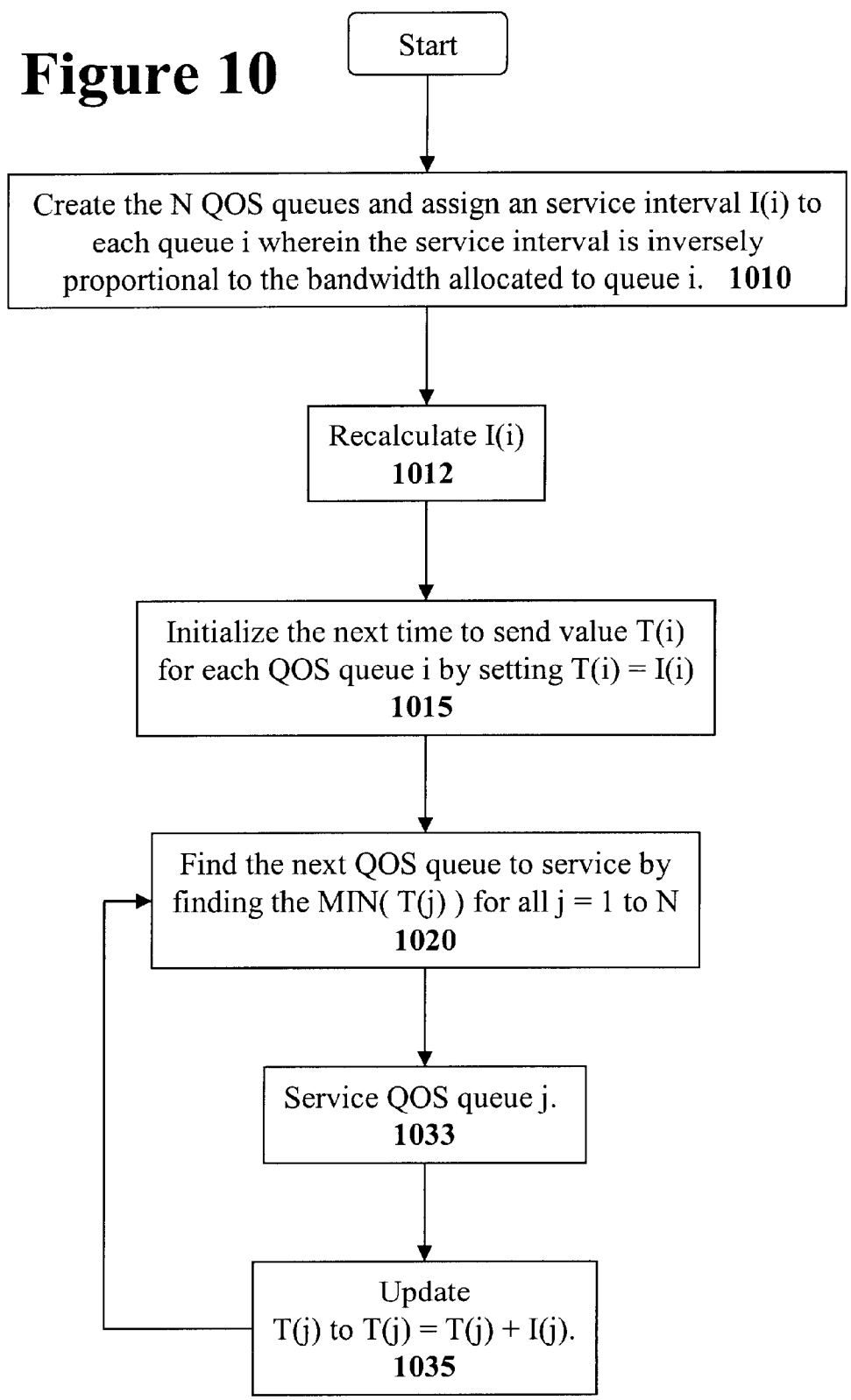
FIG. 10 illustrates a flow diagram describing the operation of an interval based packet scheduler.

FIG. 10 illustrates a generalized flow diagram of a service interval based packet scheduling method. At the first step

1010, a cell interval, time I(i) is assigned to each QoS queue that will be served. At step 1015, the queue scheduler is initialized. Specifically, at step 1015 a time reference variable TR is set to zero and a NTTS variable T(i) for each QoS queue 1 through N is set to the QoS queue's interval time I(j). After the initialization step 1015, the cell scheduling method is ready to begin servicing data packets from the QoS queues.

At step 1020, the scheduling method selects the first non empty QoS queue j, where the NTTS variable T(j) is the smallest T(k) where k=1 through N. After having selected a nonempty queue j with the smallest service time T(j), then that queue j is serviced at step 1033. Next, at step 1035 the method updates the NTTS variable T(j) for that queue j is determined. Specifically, the QoS queue's interval time I(j) is added to its NTTS variable T(j) to determine a next time to send. It should be noted that FIG. 10 provides a simplified version of one possible interval time based scheduling algorithm. Many variations of interval based scheduling variations exist. Furthermore, many other types of scheduling algorithms that require a minimum or maximum value from a set of values exist and would benefit from the teachings of the present invention. For example, adjustments must be made to handle NTTS variable overflows.

An Array of Cells with Min/Max Functions

The interval based scheduling system described in the previous section is rather simple to implement. All of the operations are trivial integer based arithmetic and comparison functions. However, to implement an interval based scheduling system in a very high-speed network environment the operations of the interval based scheduling system must be performed exceedingly fast.

The most difficult aspect of interval based scheduling method disclosed in FIG. 10 is locating the QoS queue having the smallest NTTS variable T(j) of all the QoS queues as specified in step 1020. In a network device that uses many different QoS queues, the network device would need to search through the list of QoS queues and compare all the NTTS variables T(i) of all the QoS queues.

To aid in implementing an interval based scheduling system, one embodiment of the present invention provides a minimum/maximum (min/max) feature. Specifically, each nanocomputer includes min/max logic that allows the nanocomputer to quickly locate a minimum or maximum value stored within a subset of its memory. Each rib control unit also includes min/max logic such that the rib control unit can determine the minimum/maximum value of all the nanocomputers on its rib bus. Finally, the main control logic includes minimum/maximum logic that selects the minimum or maximum value from the various, rib bus control units.

Figure 11:
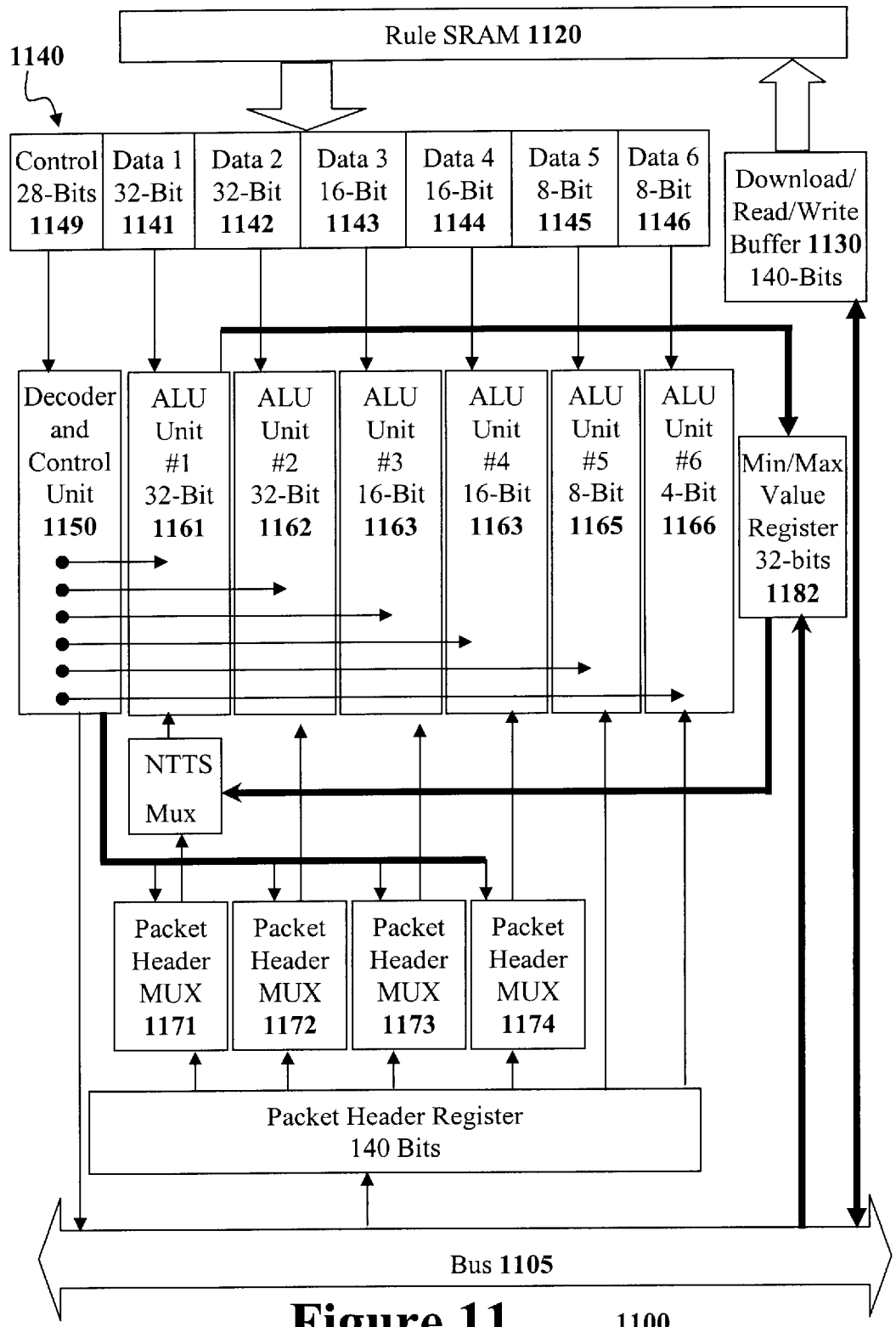
FIG. 11 illustrates one possible embodiment of an individual nanocomputer that provides a minimum/maximum function.

FIG. 11 illustrates one possible embodiment of a nanocomputer unit with a min/max value register 1182 for storing a current minimum/maximum value. When the nanocomputer of FIG. 11 is instructed, the nanocomputer reads a first RAM rule entry containing a value to be compared into the min/max value register 1182. Next, the nanocomputer loads a next RAM rule entry containing a value to be compared into register 1140. The nanocomputer then compares the value in the min/max value register 1182 against that value with a 32-bit ALUs 1161. If the value in the register 1140 exceeds the threshold comparison against the value in min/max value register 1182 (is less than a current minimum value or is greater than a current maximum value) then that value in register 1140 is loaded into the min/max value register 1182. The nanocomputer successively cycles all the rule RAM 1120 entries that contain values to be compared such that the min/max value register 1182 will contain the minimum or maximum entry in the RAM 1120. After completing the series of cycles that examine all the relevant entries in the RAM 1120, the nanocomputer will report the value in the min/max value register 1182 to its rib control unit when requested.

Referring back to FIG. 6a, the rib priority unit in each rib control unit examines the min/max values from all the nanocomputers on its rib bus. The rib control unit will then place the minimum or maximum amount into a value register (615, 617, . . . , 619) in the rib control unit. Finally, the control unit 600 will examine all the value register (615, 617, . . . , 619) in each rib priority unit and select the minimum or maximum value for the entire AoC array.

Using the min/max feature of the present invention, a packet inspector engine can quickly locate a minimum or maximum values stored within the RAM entries, of the Array of Cells. In an application where 8192 queue values must be examined to locate a minimum value, a linear search system would require 8192 cycles. However, the present invention can perform such a search in approximately 64 cycles. Specifically, each nanocomputer uses 32 cycles to locate a local minimum from the 32 rule entries in the nanocomputer, then each rib bus control unit uses 16 cycles to determine a rib bus minimum value from the local minimum values in the 16 nanocomputers that report to the rib bus control unit, and finally the main control unit determines a global minimum value by examining the 16 rib bus minimum values in the 16 rib bus control units. A few extra cycles may be needed for reading and writing values.

Load Balancing using the Array of Cells Engine

Load Balancing can be implemented in the AoC compare engine by storing a load value representing the load on different servers in the rule entry cells. This load value may be expressed by different criteria based on the load balancing implementation. The Min/Max feature of the present invention can be used to quickly find the minimum rule entry containing the minimum load value. This minimum load value indicates the server having the lightest load.

In one embodiment, the load of a selected server is then updated to include the new load. For example, the load value can be incremented by a fixed number representing the number of packets sent to the server or the load value can be incremented by the packet count or byte count.

A more complex update of the server load value can be done based upon other specific characteristics of the connection as implied by the classification of the packet done by the AoC.

Network Address Translation Using the Array of Cells Engine

The Packet Inspector Engine and the array of cells compare engine of the present invention can be used to help perform network address translation in a simple manner. With the teachings of the present invention, a nanocomputer can "learn" about a new TCP connection when the new TCP connection is established. Specifically, a nanocomputer can store the source IP address, destination IP address, source TCP port, and destination TCP port for the new TCP connection into a rule entry. To later identify data packets that belong to that TCP connection, a network address translation area of the array of cells attempts to match an incoming packet to the known TCP connections. When a known TCP connection is located, the cell number is used to identify a record that stores information about that TCP connection.

AoC Control System

As previously set forth, the operation of the Array of Cells is controlled by Command Words (CWords) and Operation Cycle descriptors (OCs).

Figure 12A:
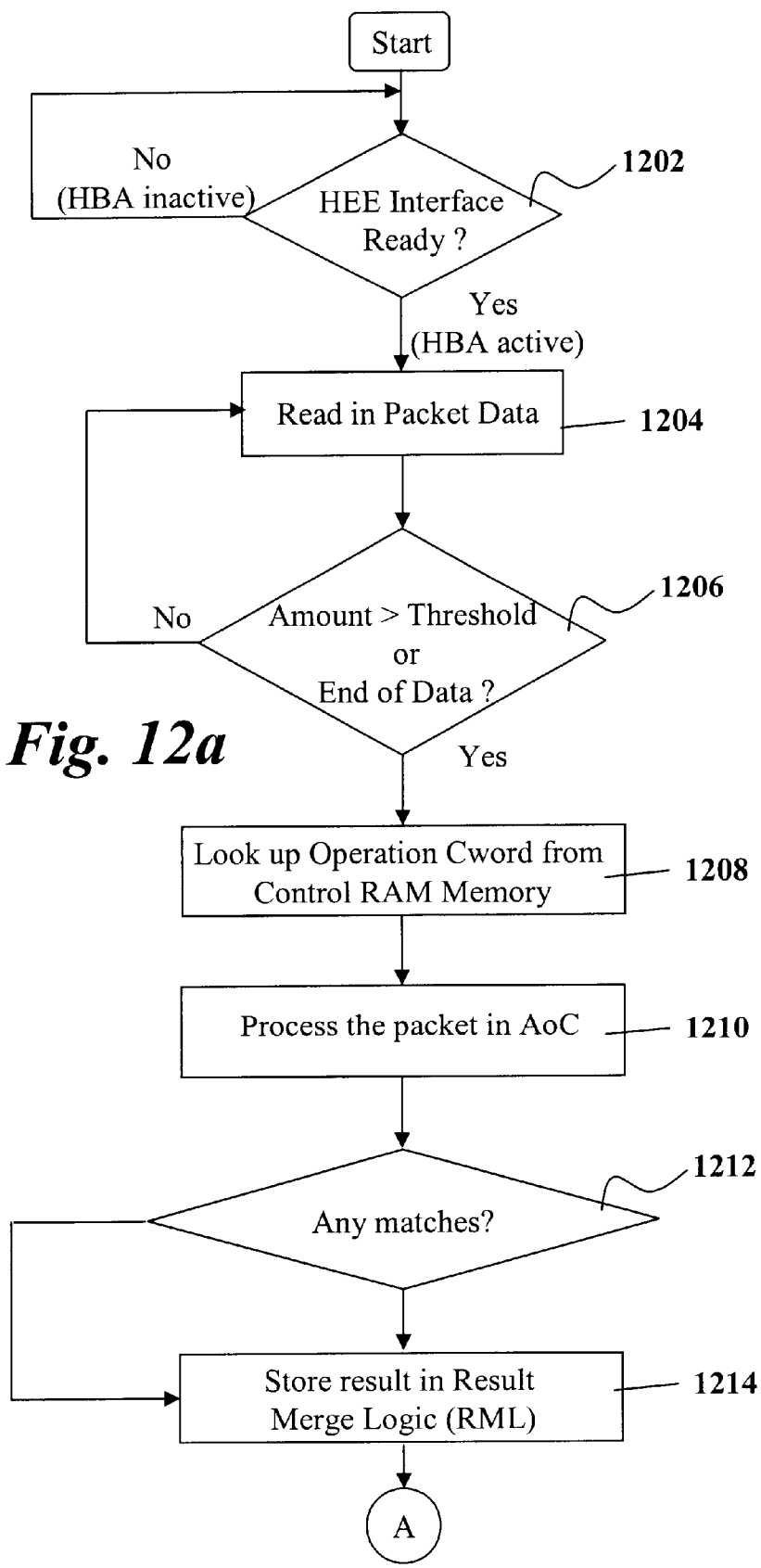
FIGS. 12a and 12b show a process flowchart of the control system according to one embodiment of the present invention.
Figure 12B:
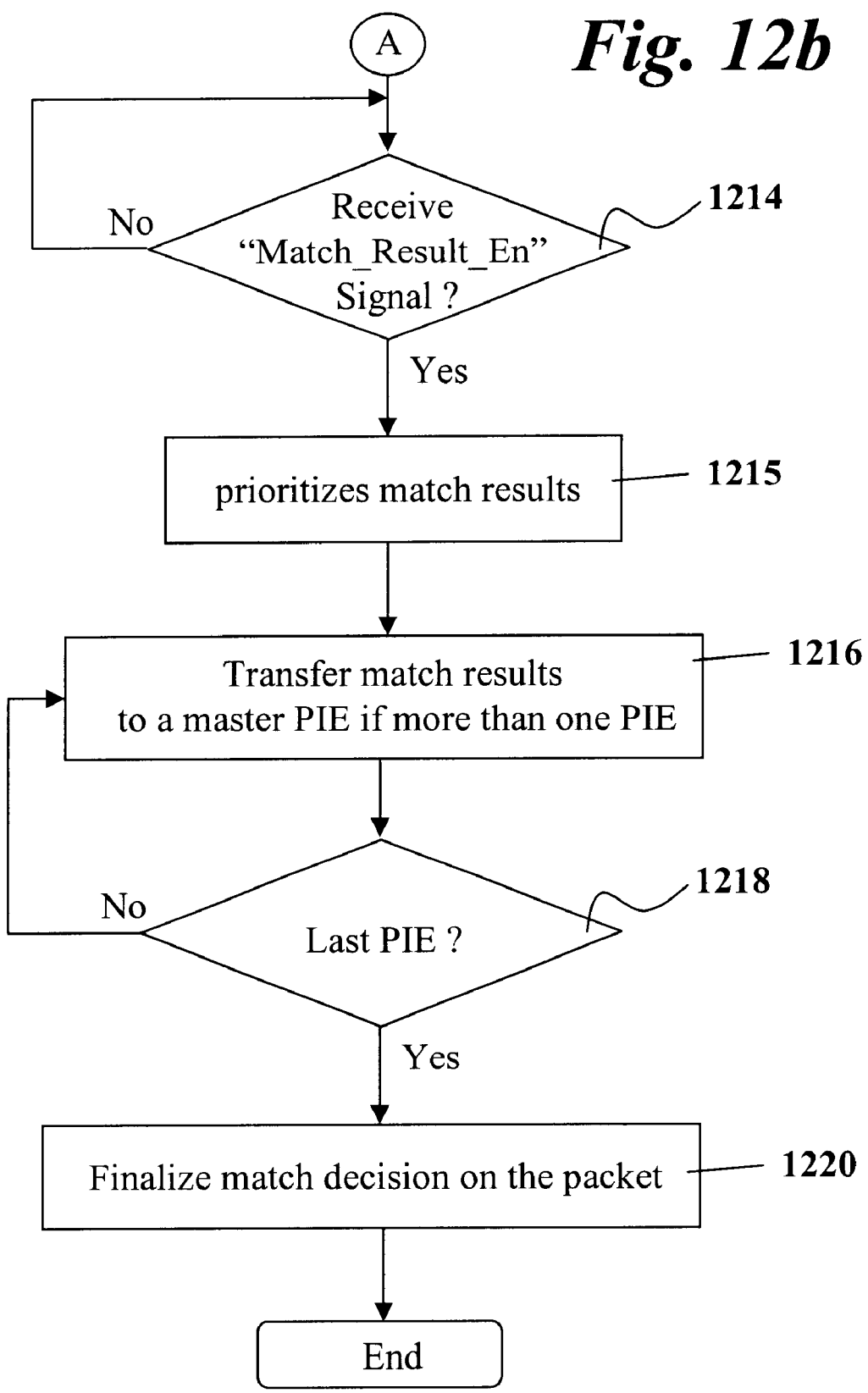

FIGS. 12a and 12b illustrate a processing flowchart of the operations of the control system for high-speed rule processors according to one embodiment of the present invention. FIGS. 12a and 12b should be understood in conjunction with FIGS. 2a, 3a, 3b, and 4a. At step 1202, port processor 294 detects if a signal "HEE Buffer Available" or HBA is, sent out from HEE 330. With HBA being inactive, no packet information will be received in the HEE 330. As soon as HBA is present (active), the packet information in either 32 bits or 64 bits are presented to the HEE 330. At 1204, the packet information is read in and stored accordingly in HEE registers 316. To prevent data overflow, the HEE 330, as described above, maintains a pair of registers storing thresholds indicating how much data HEE 330 can accommodate for subsequent processing in AoC 300.

At step 1206, HEE 330 consults to the thresholds and determines if the packet information being received exceeds the thresholds. When the packet information is fully read in, the PIE consults the operation CWord originally from Control RAM memory 390 through the cascade bus 307 at step 1208. As described above, the CWord is sequenced and pertinent bits are respectively stored in AoC registers 314. According to the contents in AoC registers 314, the packet data from the HEE 330 are forwarded to AoC 300 for processing at step 1210.

As described above, each cell in AoC 300 process the packet data according to its own allocated rules and parameters depending on the exact application of a gateway at step 1212. If the packet data match any of the rules and parameters, the match results (packet decision) are stored in a logic circuit called Result Merge Logic (RML) 362 at step 1214. If there is no any matches in the processing at step 1212, the no-match decision may be stored in RML 362 at step 1214 or simply discarded.

When there are multiple PIES configured for cascading operation, each of the PIES goes through the same process steps 1202 to 1214. Generally, multiple PIES are sequentially labeled by an identifier (identity) and there is a master PIE and the rest are considered slave PIES. At step 1215, the multiple PIES determine the priority of each of other PIES by examining the respective identity of each of the other PIES. At step 1214, the master PIE sends out a signal "Match_Result_En" which enables all of the slave PIES to release the respective match results to the master PIE. Upon detecting the presence of the signal, the RML 362 in the slave PIES start sequentially to release the content therein to the master PIE at step 1216 through a common data bus all of the PIES are coupled thereto. The order of releasing the match result from each of the slave PIES may be based on the identity of the PIES, typically a higher number of the identity has the result forwarded first. At step 1218, the master PIE determines if all of the respective match results in the RML of each of the slave PIES have been collected by examining a last identity identifying a last PIE. When the last identity is reached, i.e. all of the match results are collected, the master PIE forms a match decision at step 1220 on the packet whose information has been just processed.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A method for controlling rule processors in a gateway managing data traffic between two networks, said method comprising:

receiving packet information derived from a packet arrived in the gateway;

looking up control words in internal registers;

processing, concurrently and respectively, said packet information within a plurality of nanocomputers with respect to a set of rules, said plurality of nanocomputers organized into nanocomputer groups, each of said nanocomputers controlled and operating under the control words;

returning match results from said plurality of nanocomputers to a nanocomputer group if said packet information matches any of the rules;

prioritizing said match results within said nanocomputer group that contains a match and returning a group prioritized result from said nanocomputer group to a control unit; and prioritizing said group prioritized results respectively from said each nanocomputer group to generate a said final prioritized result.

2. The method as claimed in claim 1, wherein said receiving packet information comprises:

writing said packet information into an internal buffer; and determining if said packet information exceeds a threshold, said threshold indicating the amount of data that can be received for processing.

3. The method as claimed in claim 1, wherein said looking up control words comprises:

accessing said control words from a memory through a data bus; wherein said control words comprises instructions for operation cycles to be executed.

4. The method as claimed in claim 3, further comprising:

returning match results from said plurality of nanocomputers if said packet information matches any of the rules.

5. The method as claimed in claim 4; wherein said match results are group prioritized results within each nanocomputer group; and said method further comprising determining a final prioritized result from said group prioritized results.

6. The method as claimed in claim 5 wherein said determining a final prioritized result comprises:

prioritizing said final prioritized result from said group prioritized results respectively from said each nanocomputer group that produces said match results.

7. The method as claimed in claim 1, still further comprising:

storing said final prioritized result in a local memory; and releasing said final prioritized result from said local memory to said data bus upon detecting an enable signal therefrom.

8. The method as claimed in claim 7, wherein said local memory is a result merge logic circuit coupled to said data bus.

9. An apparatus for managing packet data in a gateway managing data traffic between two networks, said apparatus comprising:

an interface receiving packet information derived from a packet arrived in the gateway when said interface sends out a ready signal; said interface further comprising:
a number of attribute registers, each storing one aspect of attributes in said packet information, and
at least one threshold register containing a value specifying a limited amount of data said interface can accommodate for subsequent processing;

an array of nanocomputers, each processing, concurrently and respectively, said packet information with respect to an allocated set of rules; a match result generated when said packet information matches any of said rules;

a plurality of group logic circuits for receiving respective match results from a respective group of nanocomputers, said group logic circuits generating a prioritized group result; and a control unit for receiving respective prioritized group results from said group logic circuits, said control unit generating a prioritized final result from said prioritized group results.

10. The apparatus as claimed in claim 9, wherein said control unit receives instructions and distributes said instructions to said array of nanocomputers according to control words from a control RAM coupled to a data bus.

11. The apparatus as claimed in claim 10, wherein said instructions comprise rules and control parameters under which said array of nanocomputers operate.

12. The apparatus as claimed in claim 11; wherein said plurality of group logic circuits is also coupled to said data bus.

* * * * *